(12) United States Patent
Mizuno et al.

(10) Patent No.: US 11,204,941 B2
(45) Date of Patent: Dec. 21, 2021

(54) DISTRIBUTED DATABASE SYSTEM, DISTRIBUTED DATABASE MANAGEMENT METHOD, AND DISTRIBUTED DATABASE MANAGEMENT PROGRAM

(71) Applicant: Hitachi, Ltd., Tokyo (JP)

(72) Inventors: Jun Mizuno, Tokyo (JP); Takashi Tameshige, Tokyo (JP); Soichi Takashige, Tokyo (JP); Nobuhiro Maki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 16/288,490

(22) Filed: Feb. 28, 2019

(65) Prior Publication Data

US 2020/0065316 A1    Feb. 27, 2020

(30) Foreign Application Priority Data

Aug. 27, 2018    (JP) .............................. JP2018-157983

(51) Int. Cl.
*G06F 16/27* (2019.01)
*G06F 3/06* (2006.01)
*H04L 29/08* (2006.01)

(52) U.S. Cl.
CPC .............. *G06F 16/27* (2019.01); *G06F 3/065* (2013.01); *G06F 3/067* (2013.01); *G06F 3/0617* (2013.01); *H04L 67/1044* (2013.01)

(58) Field of Classification Search
CPC ........ G06F 16/27; G06F 3/0617; G06F 3/067; G06F 3/065; G06F 3/0685; H04L 67/1044; H04L 41/0856

USPC ......................................................... 707/809
See application file for complete search history.

(56) References Cited

U.S. PATENT DOCUMENTS

| 8,984,027 | B1* | 3/2015 | Patwardhan | .......... G06F 16/119 |
| | | | | 707/809 |
| 10,863,220 | B2* | 12/2020 | Peters | .................. H04N 21/632 |
| 2014/0052761 | A1* | 2/2014 | Teitelbaum | ......... G06F 12/0866 |
| | | | | 707/803 |

(Continued)

FOREIGN PATENT DOCUMENTS

WO    WO 2013/046352 A1    4/2013

*Primary Examiner* — Dangelino N Gortayo
(74) *Attorney, Agent, or Firm* — Crowell & Moring LLP

(57) ABSTRACT

The present invention ensures improving responsiveness in a P2P type distributed database system that includes a plurality of node computers capable of storing management target data in storage devices. The storage devices include a first type storage device having a high input/output performance and a second type storage device having a low input/output performance. There is provided the storage devices that store KeySpace management tables including response count information indicative of a count of the node computers from which the identical management target data are to be read. The identical management target data are required to respond to a read request of the management target data. The node computers by a count indicated by the response count information and capable of storing the management target data in the first type storage devices among the plurality of node computers are determined as storage destinations when a CPU receives a write request of new management target data. The determined node computers are caused to store the management target data.

10 Claims, 29 Drawing Sheets

(56) References Cited

U.S. PATENT DOCUMENTS

| | | | |
|---|---|---|---|
| 2014/0281225 A1* | 9/2014 | Grube | G06F 11/2089 |
| | | | 711/114 |
| 2015/0312334 A1* | 10/2015 | Toriumi | H04L 41/0893 |
| | | | 709/201 |
| 2016/0077741 A1* | 3/2016 | Newby, Jr. | G06F 3/0647 |
| | | | 711/165 |
| 2018/0227293 A1* | 8/2018 | Uhr | H04L 9/0643 |
| 2018/0260190 A1* | 9/2018 | Su | G06F 16/2237 |

* cited by examiner

FIG. 4

| KEYSPACE 3025a | COLUMNFAMILY 3025b | ROW 3025c | NAME 3025d | VALUE 3025e | TIMESTAMP 3025f |
|---|---|---|---|---|---|
| KS_A | CF_1 | ROWID1 | DATA1 | VAL1 | 20180320 00:00:00 |
| KS_B | CF_5 | ROWID9 | DATA2 | VAL2 | 20180320 00:00:10 |
| KS_A | CF_1 | ROWID1 | DATA3 | VAL3 | 20180320 00:00:13 |
| KS_C | CF_3 | ROWID5 | DATA4 | VAL4 | 20180320 00:00:15 |
| KS_A | CF_1 | ROWID1 | DATA5 | VAL5 | 20180320 00:00:20 |

3025

| NODE ID | DC | RACK | I/O DEVICE TYPE |
|---|---|---|---|
| NODE1 | DC1 | RACK1 | SSD |
| NODE2 | DC1 | RACK1 | HDD |
| NODE3 | DC1 | RACK1 | HDD |
| NODE4 | DC1 | RACK2 | SSD |
| NODE5 | DC1 | RACK2 | HDD |
| NODE6 | DC1 | RACK2 | HDD |
| NODE7 | DC1 | RACK3 | SSD |
| NODE8 | DC1 | RACK3 | HDD |
| NODE9 | DC1 | RACK3 | HDD |

FIG. 6

| KEYSPACE | REDUNDANCY LEVEL | MATCH LEVEL |
|---|---|---|
| KS_A | 3 | 2 |
| KS_B | 3 | 1 |
| KS_C | 3 | 2 |

FIG. 18

| LOGIC VOLUME ID | CONNECTION DESTINATION | I/O DEVICE ID | I/O DEVICE TYPE |
|---|---|---|---|
| VOL_A | NODE1 | 00:00 | SSD |
| VOL_B | NODE2 | 00:01 | HDD |
| VOL_C | NODE3 | 00:02 | HDD |

FIG. 25

| NODE | IOPS | CPU USAGE PERCENTAGE | I/O DEVICE TYPE |
|---|---|---|---|
| SDS_A | 1000 | 50% | SSD |
| SDS_B | 1200 | 60% | HDD |
| SDS_C | 1100 | 40% | HDD |

FIG. 28

| NETWORK | BAND USAGE PERCENTAGE |
|---|---|
| CLUSTER NETWORK | 30% |
| SDS CLUSTER NETWORK | 70% |

DISTRIBUTED DATABASE SYSTEM, DISTRIBUTED DATABASE MANAGEMENT METHOD, AND DISTRIBUTED DATABASE MANAGEMENT PROGRAM

BACKGROUND

The present invention relates to a technique that manages a distributed database system including a plurality of node computers.

In a System of Engagement (SoE) market, cost consciousness is higher than that in a System of Record (SoR) market and therefore a low-cost system is required in addition to high availability and high performance.

Among a plurality of pieces of software constituting an IT system, database management software is used to hold a wide variety of data types. Since an increase and a decrease in data amount are difficult to be predicted in a system for SoE, a distributed database in which scaling out is easy is used.

The distributed database constitutes a cluster with a plurality of node computers (also referred to as nodes). When a Write request is generated, the plurality of nodes hold identical data (replica) to keep the availability.

Meanwhile, responsiveness of each node depends on a performance of an I/O device (a storage device such as a Solid State Drive (SSD) and a Hard Disk Drive (HDD)) holding the data. Therefore, to enhance the responsiveness of the distributed database, it has been necessary to configure the I/O device in each node with a high performance device, for example, the SSD. The high-performance I/O device is generally expensive and therefore constructing the high-performance distributed database at low cost is difficult.

To construct the distributed database at low cost, the SSDs are not used in all nodes constituting the distributed database but inexpensive HDDs are used in some nodes.

For example, WO 2013/046352 discloses the following technique. In a master slave type distributed database, data replication is determined as successful at a point when data arrives at a network for slaves and completion of writing is notified to a client.

In such master slave type distributed database, a replica is created first in a master node and then the replicas are created in slave nodes. Therefore, the use of the technique disclosed in WO 2013/046352 ensures high-performance responsiveness of the distributed database with the use of the SSD for the master node and the use of the HDDs for the slave nodes. Additionally, the use of the HDDs for some nodes allows achieving a low cost compared with the case of the use of the SSDs for all nodes.

SUMMARY

For example, in the master slave type distributed database, the master node serves as a single point of failure and this causes a problem in terms of availability. There is provided a Peer to Peer (P2P) type distributed database to avoid such problem. In the P2P distributed database, all nodes have identical functions, and holding identical data among a plurality of nodes keeps the availability. Since a specific node does not play a special role, even when a node failure occurs, another node can substitute for the node and therefore the service can be continued.

However, in the P2P distributed database, the node that creates the first replica is randomly selected dynamically. Therefore, in the case where the nodes using the SSDs and the nodes using the HDDs are mixed and the node using the HDD is selected as the node creating the replica first, the responsiveness of the distributed database to the client is deteriorated even the use of the technique disclosed in WO 2013/046352.

The present invention is to provide a technique that can improve responsiveness in a P2P distributed database system.

To achieve the above-described object, a distributed database system according to one aspect is configured as follows. The distributed database system includes multiple node computers. The multiple node computers are capable of storing management target data used by a client computer in storage devices. The storage devices include a first type storage device and a second type storage device. The first type storage device has a high input/output performance. The second type storage device has a low input/output performance. The distributed database system includes management information storage units, a storage destination determining unit, and a storage control unit. The management information storage units store management information including response count information. The response count information indicates a count of the node computers from which the identical management target data are to be read. The identical management target data are required to respond to a read request of the management target data from the client computer. The storage destination determining unit determines the node computers by a count indicated by the response count information and capable of storing the management target data in the first type storage devices as storage destinations of the management target data among the multiple node computers when the storage destination determining unit receives a write request of new management target data from the client computer. The storage control unit causes the determined node computers to store the management target data.

The present invention can improve the responsiveness in the P2P distributed database system.

BRIEF DESCRIPTION OF THE DRAWINGS

FIG. 4 is a block diagram of a data management table according to the first embodiment;

FIG. 6 is a block diagram of a KeySpace management table according to the first embodiment;

FIG. 18 is a block diagram of a logic volume management table according to the third embodiment;

FIG. 25 is a block diagram of an operating information management table according to the fourth embodiment;

FIG. 28 is a block diagram of a network load management table according to the fifth embodiment.

DETAILED DESCRIPTION

The following describes embodiments with reference to the drawings. Note that the embodiments described hereinafter do not limit the invention according to the claims. Additionally, all of various components and their combinations described in the embodiments are not limited to be necessary for the solution of the invention.

While the following description describes information by an expression such as "AAA table" in some cases, the information may be expressed by any data structure. That is, it is also allowed to refer to "AAA table" as "AAA information" in order to indicate that the information does not depend on the data structure.

In the following description, "processor unit" includes one or more processors. At least one processor typically is a microprocessor like a Central Processing Unit (CPU). Each of one or more processors may be single core or may be multiple cores. The processor may include a hardware circuit that performs a part or all of the process.

In the following description, there is a case where the process is described using "program" as a core of the operation. This program is executed by the processor unit to execute a determined process while appropriately using at least one of a storage unit and an interface unit; therefore, the operation core of the process may be the processor unit (or a calculator or a computer system including the processor unit). The program may be installed into the calculator from a program source. The program source may be one that is provided by, for example, a program distribution server or a storage medium readable by the computer. In the following description, two or more programs may be achieved as one program, or one program may be achieved as two or more programs. At least a part of the process achieved through the execution of the program may be achieved by a hardware circuit (for example, an Application Specific Integrated Circuit (ASIC) or a Field-Programmable Gate Array (FPGA)).

First Embodiment

First, the following describes a computer system according to the first embodiment of the present invention.

Figure 1:
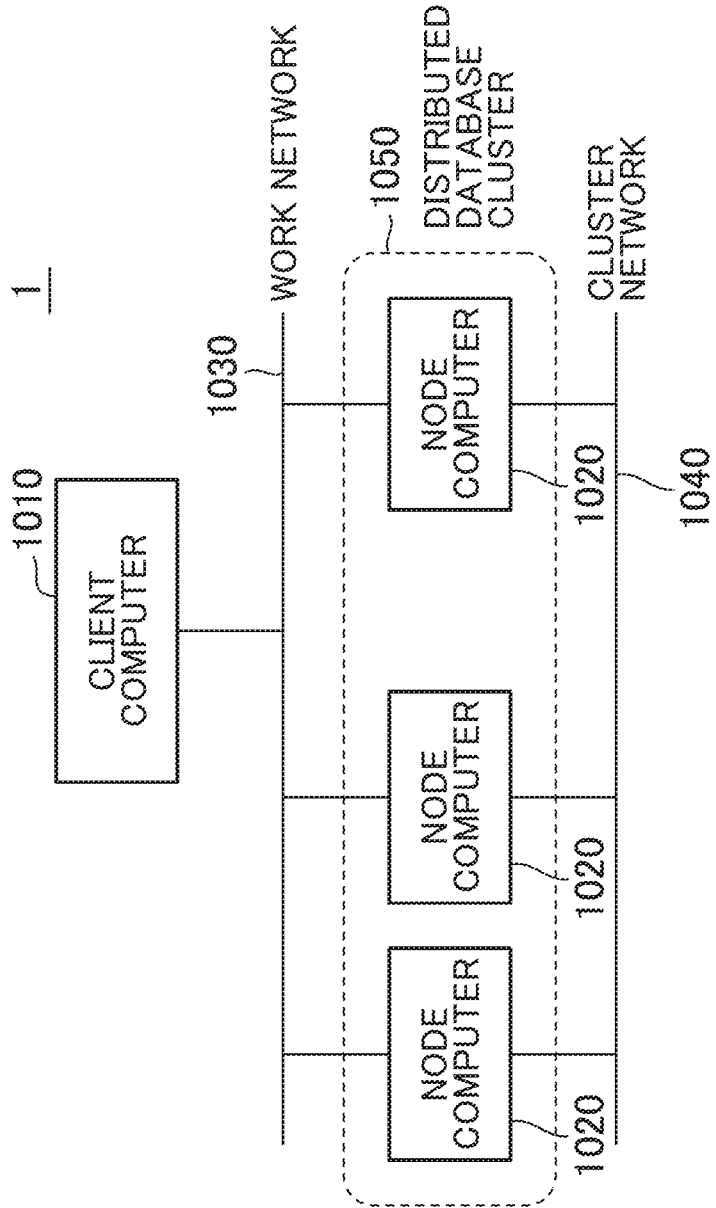
FIG. 1 is an overall block diagram of a computer system according to a first embodiment.

FIG. 1 is an overall block diagram of the computer system according to the first embodiment.

A computer system 1 includes one or more client computers 1010 and a plurality of node computers 1020. The client computer 1010 and the plurality of node computers 1020 are coupled via a work network 1030. The plurality of node computers 1020 are coupled via a cluster network 1040. The work network 1030 and the cluster network 1040 may be an identical network.

In the computer system 1, the plurality of node computers 1020 constitute a distributed database cluster (distributed database system: also simply referred to as distributed database) 1050.

The client computer 1010 executes various processes using user data (management target data), transmits an I/O request (a Write request and a Read request) on the user data to the distributed database cluster 1050, and receives the response.

The node computers 1020 can store the user data used by the client computer 1010 and execute an I/O process corresponding to the I/O request from the client computer 1010.

Next, the following describes the client computer 1010 in detail.

Figure 2:
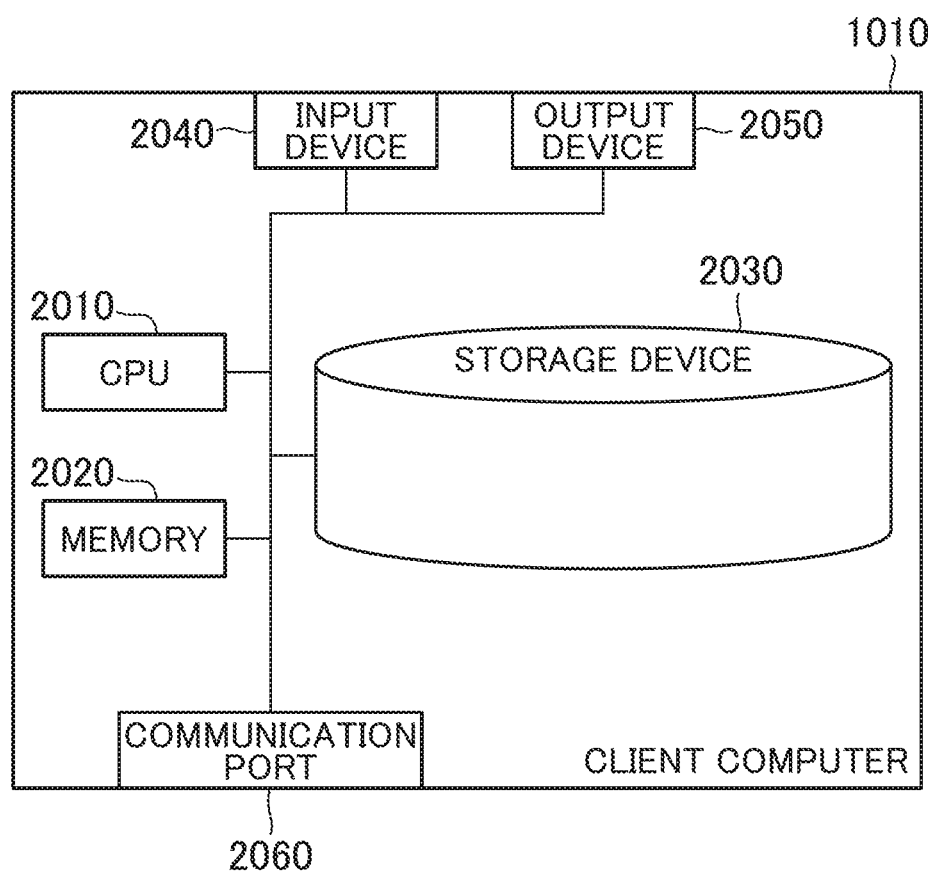
FIG. 2 is a block diagram of a client computer according to the first embodiment.

FIG. 2 is a block diagram of the client computer according to the first embodiment.

The client computer 1010 includes a Central Processing Unit (CPU) 2010 as one example of the processor, a memory 2020, a storage device 2030, an input device 2040, an output device 2050, and a communication port 2060.

The communication port 2060 is an interface such as a wired LAN card and a wireless LAN card that communicates with the respective node computers 1020 via the work network 1030.

The CPU 2010 executes various processes in accordance with programs stored in the memory 2020 and/or the storage device 2030.

The memory 2020 is, for example, a Random Access Memory (RAM) that stores the programs executed by the CPU 2010 and required information.

The storage device 2030 is, for example, a hard disk drive and an SSD that stores the programs executed by the CPU 2010 and data used by the CPU 2010.

The input device 2040 is, for example, a device that accepts an operation input by a user with, for example, a computer mouse and a keyboard. The output device 2050 is a device such as a display that displays and outputs various kinds of information.

Next, the following describes the node computer 1020.

Figure 3:
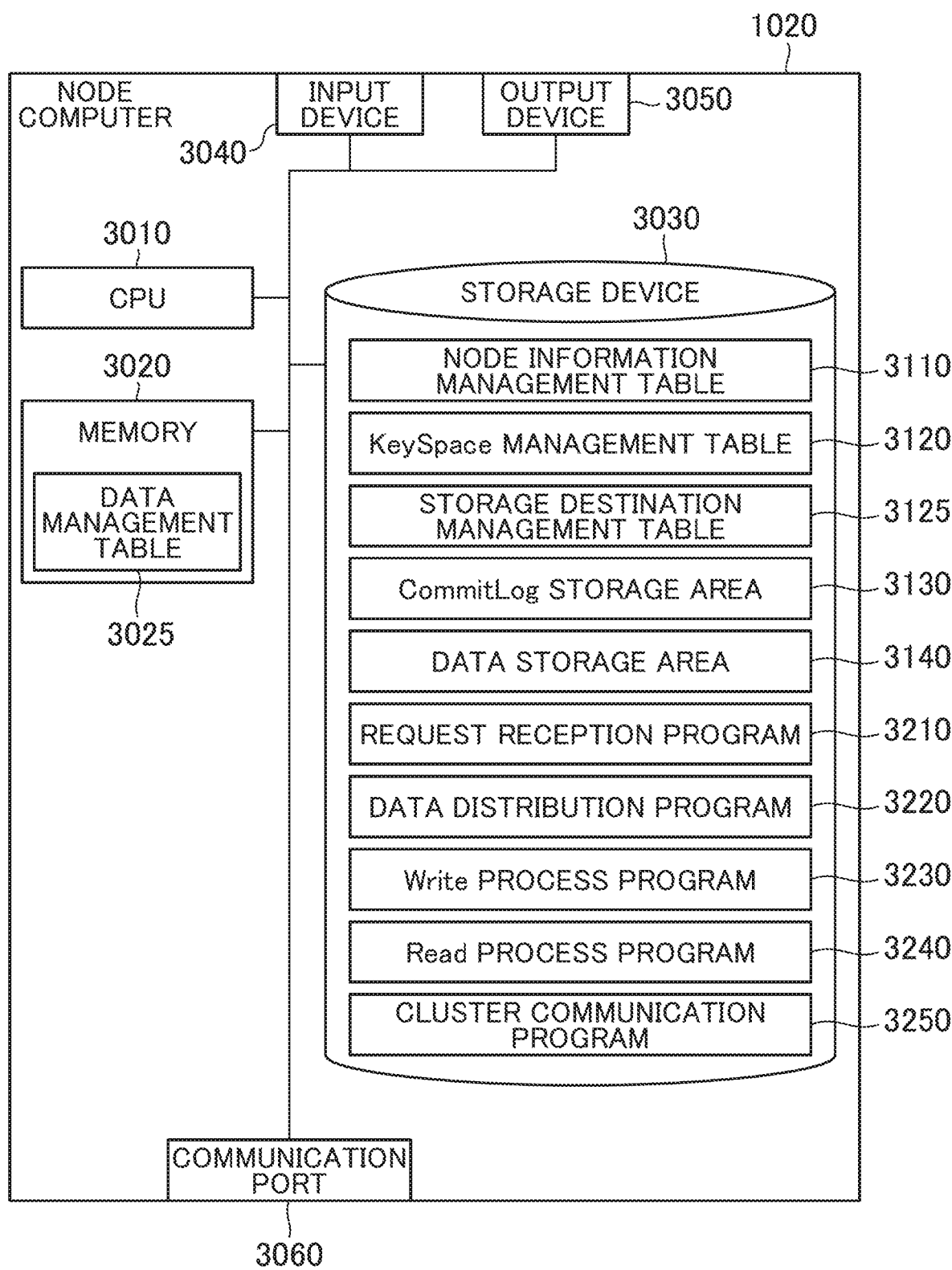
FIG. 3 is a block diagram of a node computer according to the first embodiment.

FIG. 3 is a block diagram of the node computer according to the first embodiment.

The node computer 1020 includes a CPU 3010 as one example of the processor, a memory 3020, a storage device 3030 as one example of a management information storage unit, an input device 3040, an output device 3050, and a communication port 3060.

The communication port 3060 is an interface such as a wired LAN card and a wireless LAN card that communicates with the respective client computers 1010 via the work network 1030 and communicates with another node computer 1020 via the cluster network 1040.

The CPU 3010 executes various processes in accordance with programs stored in the memory 3020 and/or the storage device 3030.

The memory 3020 is, for example, a RAM that stores the programs executed by the CPU 3010 and required information. In this embodiment, the memory 3020 stores a data management table 3025. The data management table 3025 is equivalent to memtable in Cassandra of a distributed database management system. The data management table 3025 temporarily holds data to which the Write request is generated from the client computer 1010. Details of the data management table 3025 will be described later.

The storage device 3030 is, for example, the HDD and the SSD that stores the programs executed by the CPU 3010, the data used by the CPU 3010, the user data transmitted from the client computer 1010, and the like. In the computer system 1 according to the embodiment, the node computers 1020 with the types of the storage devices 3030 of the SSDs (one example of first type storage devices) and the node computers 1020 with the types of the storage devices 3030 of the HDDs (second type storage devices) are mixed. For example, with the type of the storage device 3030 as the SSD, a performance of a response speed in I/O (I/O performance: input/output performance) is higher than that of the HDD. Meanwhile, with the type of the storage device 3030 as the HDD, the cost can be lowered compared with the case of the SSD.

In this embodiment, the storage device 3030 stores a node information management table 3110, a KeySpace management table 3120, and a storage destination management table 3125. The storage device 3030 includes a CommitLog storage area 3130 and a data storage area 3140. Additionally, the storage device 3030 stores a request reception program 3210, a data distribution program 3220, a Write process program 3230, a Read process program 3240, and a cluster communication program 3250 as the programs executed by the CPU 3010. These programs are loaded on the memory 3020 to be executed by the CPU 3010. Here, the execution of the data distribution program 3220 by the CPU 3010 configures a storage destination determining unit. The execution of the request reception program 3210 by the CPU 3010 configures a storage control unit.

The input device 3040 is, for example, a device that accepts an operation input by the user with, for example, a computer mouse and a keyboard. The output device 3050 is a device such as a display that displays and outputs various kinds of information.

Next, the following describes the data management table 3025 stored in the memory 3020 in detail.

FIG. 4 is a block diagram of the data management table according to the first embodiment.

The data management table 3025 stores entries corresponding to each predetermined unit data (unit data) to be managed. The data management table 3025 entries include columns of a KeySpace 3025a, a ColumnFamily 3025b, a Row 3025c, a Name 3025d, a Value 3025e, and a Timestamp 3025f.

The KeySpace 3025a stores an identifier (KeySpace ID) that uniquely identifies KeySpace (corresponding to an instance) to hold the unit data. The ColumnFamily 3025b stores an identifier (ColumnFamily ID) that uniquely identifies ColumnFamily (corresponding to a table) to hold the unit data. The Row 3025c stores an identifier (Row ID) that uniquely identifies a Row where the unit data is stored. The Name 3025d stores a data name (Name) that uniquely identifies the unit data. The Value 3025e stores content (Value) of the unit data corresponding to the entry. The Timestamp 3025f stores dates and times (time stamp) when the unit data corresponding to the entry is written.

Next, the following describes the node information management table 3110 in detail.

Figure 5:
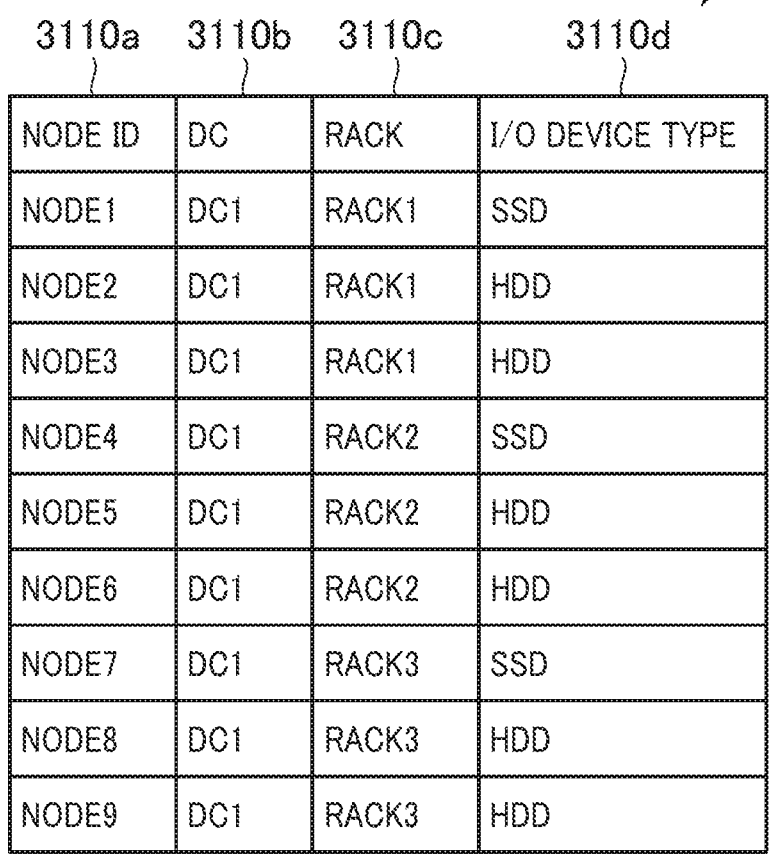
FIG. 5 is a block diagram of a node information management table according to the first embodiment.

FIG. 5 is a block diagram of the node information management table according to the first embodiment.

The node information management table 3110 stores entries for each node computer constituting the distributed database cluster 1050. The node information management table 3110 entries include columns of a node ID 3110a, a data center (DC) 3110b, a Rack 3110c, and an I/O device type 3110d.

The node ID 3110a stores an identifier (node ID) that uniquely identifies the node computer 1020 corresponding to the entry. The DC 3110b stores an identifier (DC ID) that uniquely identifies a data center where the node computer 1020 corresponding to the entry is located. The Rack 3110c stores an identifier (Rack ID) that uniquely identifies a rack where the node computer 1020 corresponding to the entry is located. The I/O device type 3110d stores the type (I/O device type) of the I/O device (the storage devices 3030 in this embodiment) used by the node computer 1020 corresponding to the entry.

Next, the following describes the KeySpace management table 3120 in detail.

FIG. 6 is a block diagram of the KeySpace management table according to the first embodiment.

The KeySpace management table 3120 stores entries for each KeySpace managed by the distributed database cluster 1050. The KeySpace management table 3120 entries include columns of a KeySpace 3120a, a redundancy level 3120b, and a match level 3120c.

The KeySpace 3120a stores a KeySpace ID of KeySpace corresponding to the entry. The redundancy level 3120b stores a redundancy level (redundancy count information) indicative of the number of pieces of replicated data (replicas) (basically, the count of node computers (I/O devices)) required to secure redundancy in the KeySpace corresponding to the entry. The match level 3120c stores a match level (response count information) indicative of the number of pieces of replicated data (replicas) (the count of node computers (I/O devices)) required to secure match in the KeySpace corresponding to the entry. Specifically, when the Read request is generated from the client computer 1010, in the case where the data read from the node computers 1020 are confirmed to match by the match level, the response is executed to the client computer 1010 with the data.

Next, the following describes the storage destination management table 3125 in detail.

Figure 7:
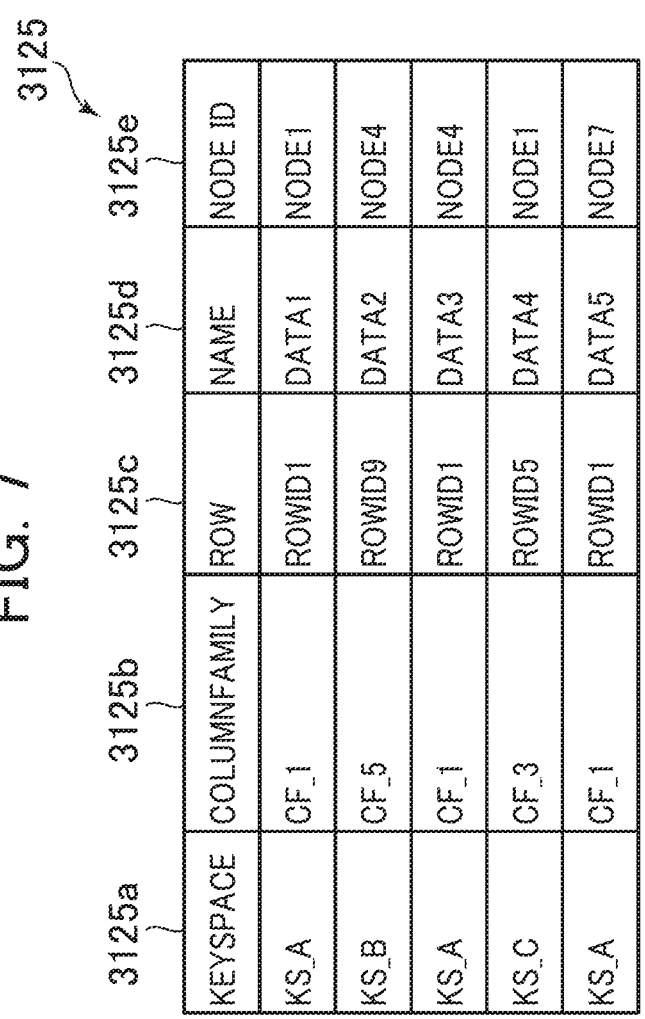
FIG. 7 is a block diagram of a storage destination management table according to the first embodiment.

FIG. 7 is a block diagram of the storage destination management table according to the first embodiment.

The storage destination management table 3125 stores entries for each unit data. The storage destination management table 3125 entries include columns of a KeySpace 3125a, a ColumnFamily 3125b, a Row 3125c, a Name 3125d, and a node ID 3125e.

The KeySpace 3125a stores a KeySpace ID of KeySpace to hold the unit data corresponding to the entry. The ColumnFamily 3125b stores a ColumnFamily ID of ColumnFamily to hold the unit data. The Row 3125c stores a Row ID of Row where the unit data is stored. The Name 3125d stores Name of the unit data. The node ID 3125e stores an identifier (node ID) that uniquely identifies the node computer storing the unit data corresponding to the entry. This storage destination management table 3125 allows identification of which node computer 1020 stores the unit data.

The CommitLog storage area 3130 is an area that stores instant logs of data to which the Write request has been executed. The CommitLog storage area 3130 stores the KeySpace ID, the ColumnFamily ID, the Row ID, the Name, the Value, and the TimeStamp of the data corresponding to the Write request whenever the Write request is generated.

The data storage area 3140 is an area as a write destination during a flush of the content in the data management table 3025 in the memory 3020. The data storage area 3140 holds the content in a data format identical to that of the data management table 3025.

Next, the following describes process operations of the distributed database cluster 1050.

First, the following describes a request handling process.

Figure 8:
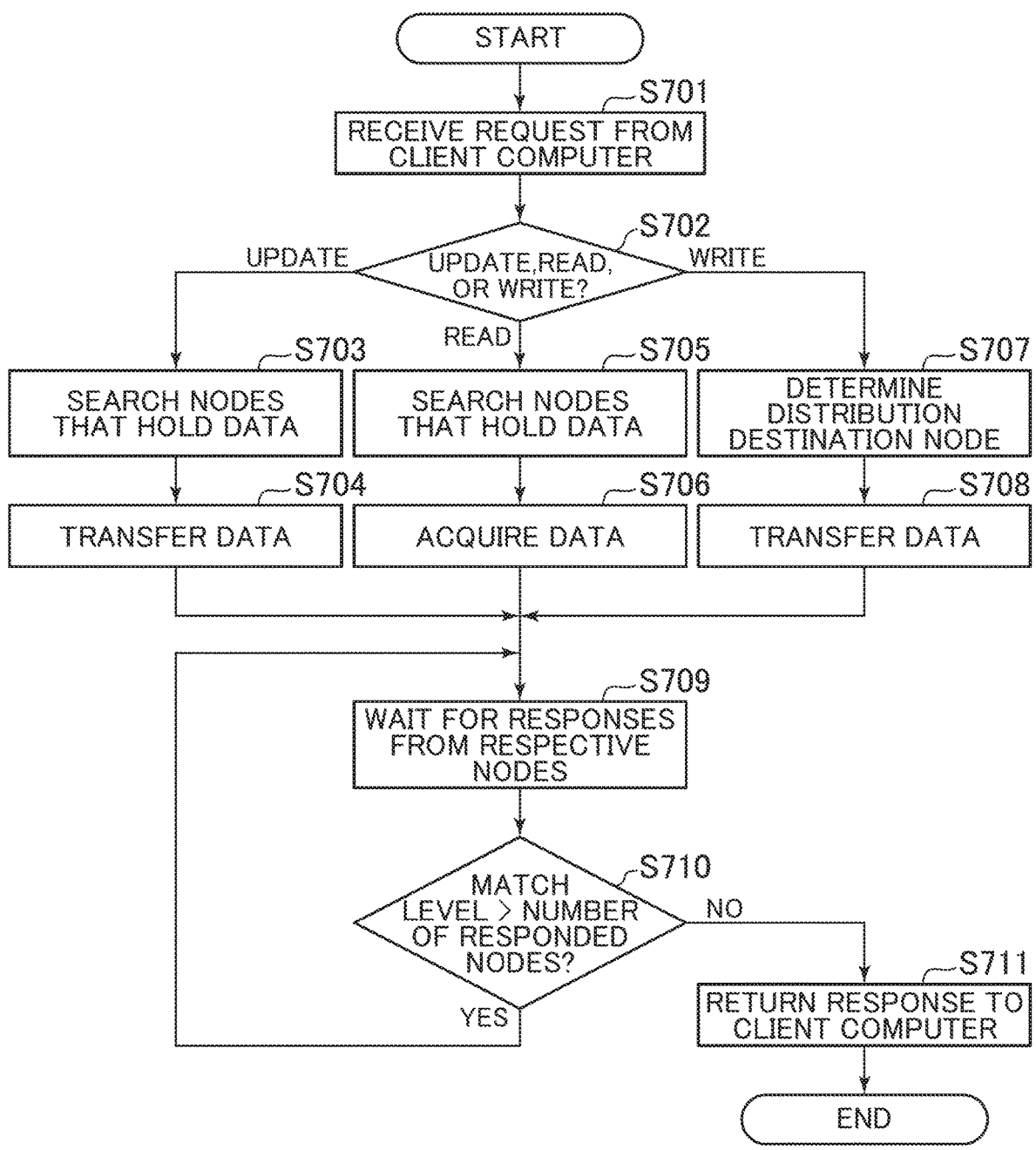
FIG. 8 is a flowchart for a request handling process according to the first embodiment.

FIG. 8 is a flowchart for the request handling process according to the first embodiment.

The request handling process is executed through the execution of the request reception program 3210 by the CPU 3010. The request handling process is executed when the request is received from the client computer 1010.

When the request is received from the client computer 1010 (S701), the request reception program 3210 (to be exact, the CPU 3010 that executes the request reception program 3210) determines whether the received request is any of Update, Read, and Write (S702).

From this result, in the case where the request is Update (S702: Update), the request reception program 3210 refers to the storage destination management table 3125 and searches the one or more node computers 1020 that hold the Update target data (S703), transfers the Write request that executes the writing on the Update target data to the searched node computers 1020 (S704), and advances the process to Step S709.

In the case where the request is Read (S702: Read), the request reception program 3210 refers to the storage destination management table 3125 and searches the one or more node computers 1020 that hold the Read target data (S705), transmits the Read request to the searched node computers 1020 (S706), and advances the process to Step S709.

In the case where the request is Write (S702: Write), the request reception program 3210 transmits a request (node determination request) to determine the node computer 1020 where the data is distributed and stored to the data distribution program 3220 and receives a determination result of the node computer 1020 where the data is distributed and stored from the data distribution program 3220 (S707), transmits the Write request to the node computer 1020 determined from the result (S708), and advances the process to Step S709.

At Step S709, the request reception program 3210 waits for responses from the respective node computers 1020 to which the requests have been transmitted, and determines whether or not the count of node computers 1020 from which the responses are received is smaller than the match levels corresponding to the KeySpace to which the request target data belong in the KeySpace management table 3120 (S710).

From this result, in the case where the count of node computers 1020 from which the responses are returned is smaller than the match level (S710: Yes), this means that the match is not confirmed; therefore, the request reception program 3210 advances the process to Step S709.

Meanwhile, in the case where the count of node computers 1020 from which the responses are returned is not smaller than the match level, that is, equal to or more than the match level (S710: No), this means that the match is confirmed; therefore, the request reception program 3210 returns the response to the client computer 1010 (S711) and terminates the process.

Next, the following describes a data distribution process.

Figure 9:
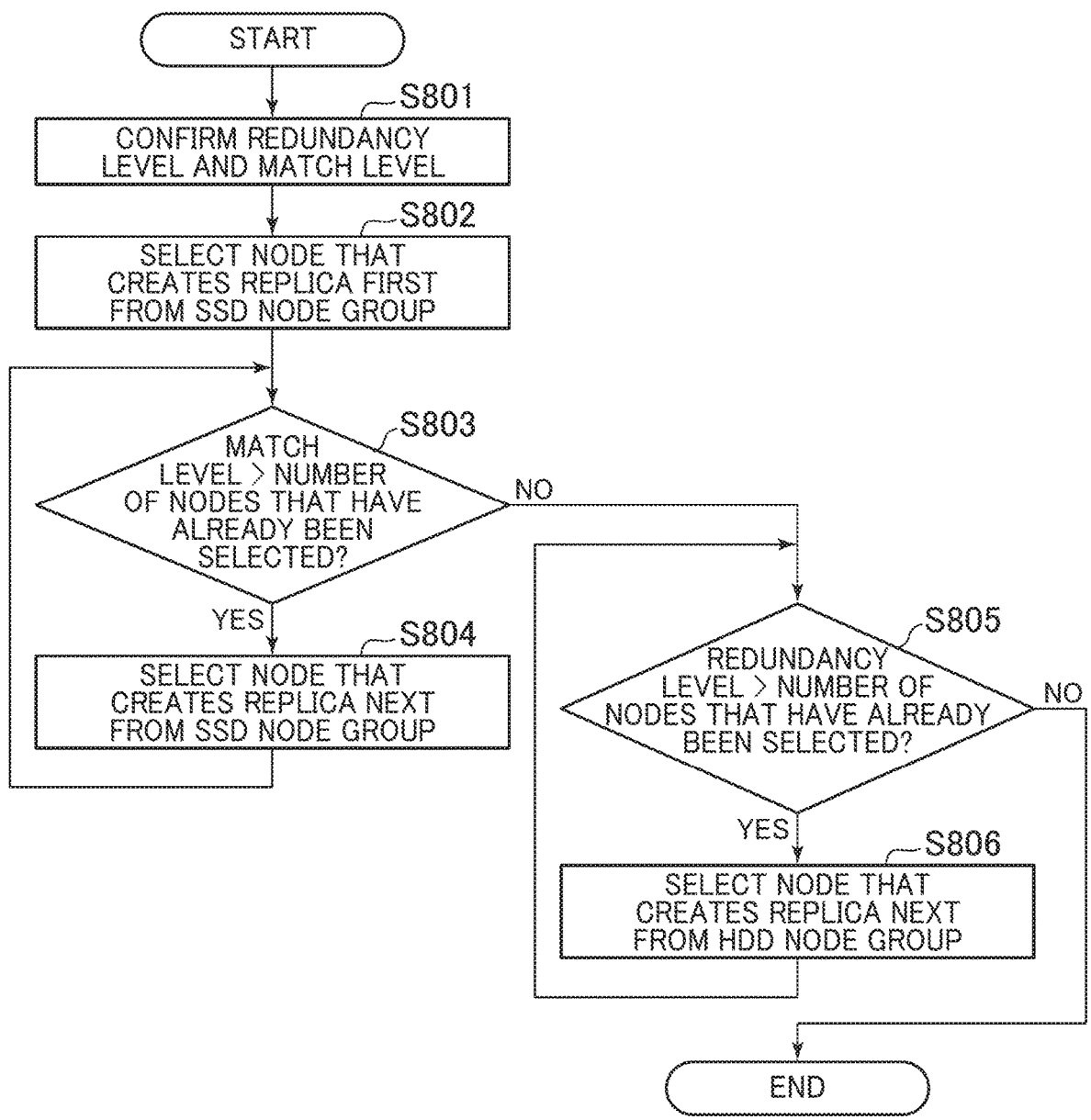
FIG. 9 is a flowchart for a data distribution process according to the first embodiment.

FIG. 9 is a flowchart for the data distribution process according to the first embodiment.

The data distribution process is executed through the execution of the data distribution program 3220 by the CPU 3010. The data distribution process is executed when the node determination request (transmitted at Step S707 in FIG. 8) is received from the request reception program 3210.

When the node determination request of the data distribution destination is received, the data distribution program 3220 confirms the KeySpace corresponding to the node determination request, refers to the KeySpace management table 3120, and acquires the redundancy level and the match level in this KeySpace (S801).

Next, the data distribution program 3220 refers to the node information management table 3110 and selects one node computer 1020 that creates the replica among the node computers 1020 with the I/O device types of SSDs (S802).

Next, the data distribution program 3220 determines whether or not the count of node computers 1020 that have already been selected is smaller than the match level acquired at Step S801 (S803).

From this result, when the count of node computers 1020 that have already been selected is smaller than the match level acquired at Step S801 (S803: Yes), this means that the node computers 1020 with the SSDs are not selected by the count required to secure the match. Therefore, the data distribution program 3220 refers to the node information management table 3110 and selects another one node computer 1020 that creates the replica among the node computers 1020 with the I/O device types of the SSDs (S804) and advances the process to Step S803.

Meanwhile, when the count of node computers 1020 that have already been selected is not smaller than the match level, that is, equal to or more than the match level (S803: No), this means that the node computers 1020 with the SSDs are selected by the count required to secure the match; therefore, the data distribution program 3220 advances the process to Step S805.

At Step S805, the data distribution program 3220 determines whether or not the count of node computers 1020 that have already been selected is smaller than the redundancy level acquired at Step S801 (S805).

From this result, when the count of node computers 1020 that have already been selected is smaller than the redundancy level acquired at Step S801 (S805: Yes), this means that the node computers 1020 are not selected by the count required to secure the redundancy. Therefore, the data distribution program 3220 refers to the node information management table 3110, selects another one node computer 1020 that creates the replica among the node computers 1020 with the I/O device types of HDDs (S806) and advances the process to Step S805.

Meanwhile, when the count of node computers 1020 that have already been selected is not smaller than the redundancy level, that is, equal to or more than the redundancy level (S805: No), this means that the node computers 1020 are selected by the count required to secure the redundancy; therefore, the data distribution program 3220 terminates the process.

This data distribution process allows appropriately selecting the node computers 1020 with the SSDs by the count corresponding to the match level and the node computers 1020 with HDDs by the count (the redundancy level-the match level) insufficient for the redundancy level as the node computers 1020 that distribute the replicas of the data.

Next, the following describes a writing process.

Figure 10:
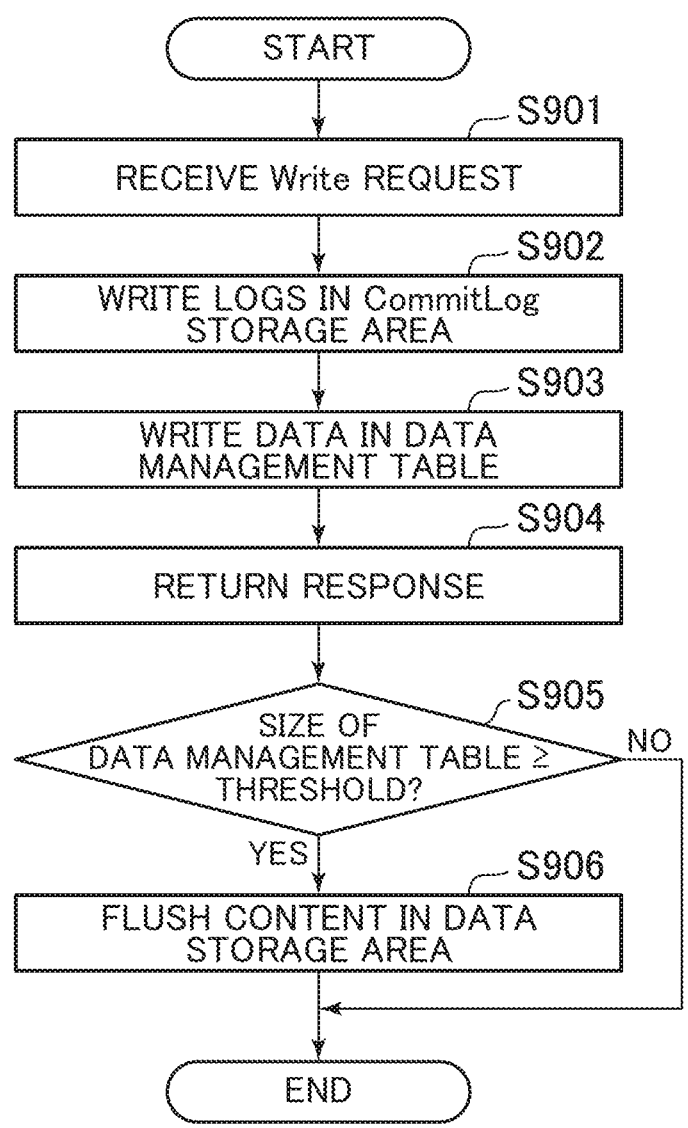
FIG. 10 is a flowchart for a writing process according to the first embodiment.

FIG. 10 is a flowchart for the writing process according to the first embodiment.

The writing process is executed through the execution of the Write process program 3230 by the CPU 3010. The writing process is executed when the Write process program 3230 receives the Write request (transmitted at Steps S704 and S708 in FIG. 8) from the request reception program 3210.

When the Write request is received (S901), the Write process program 3230 stores the KeySpace ID, the Column-Family ID, the Row ID, the Name, and the Value of the data corresponding to the Write request and the Timestamp corresponding to the Write request as the logs in the CommitLog storage area 3130 (S902), reflects the data corresponding to the Write request to the data management table 3025 in the memory 3020 (S903), and returns the response to the requester (S904).

Next, the Write process program 3230 determines whether or not the data management table 3025 has the size equal to or more than a threshold (S905). When the size of the data management table 3025 is not equal to or more than the threshold (S905: No), the process is terminated.

Meanwhile, when the data management table 3025 has the size equal to or more than the threshold (S905: Yes), the Write process program 3230 flushes the content in the data management table 3025, that is, the Write process program 3230 moves the content in the data management table 3025 to the data storage area 3140 in the storage device 3030 (S906) and terminates the process.

Next, the following describes a reading process.

Figure 11:
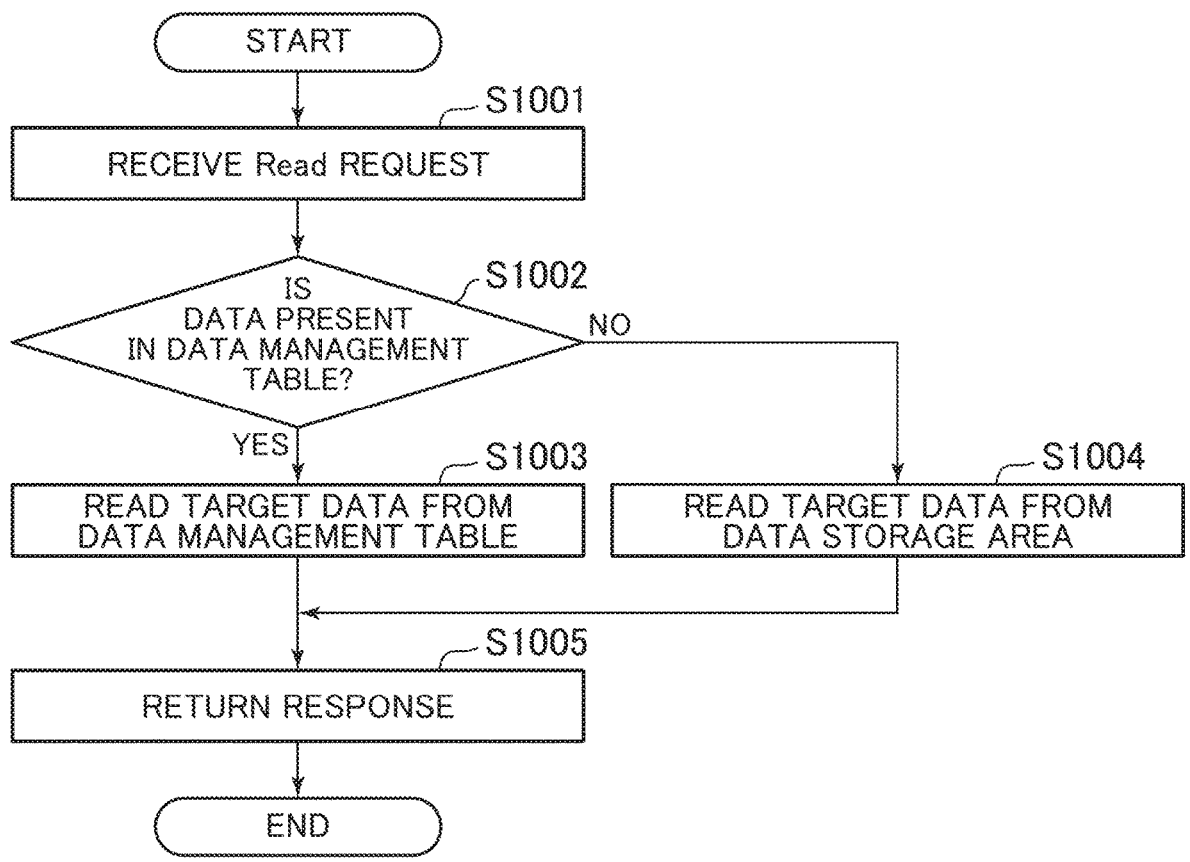
FIG. 11 is a flowchart for a reading process according to the first embodiment.

FIG. 11 is a flowchart for the reading process according to the first embodiment.

The reading process is executed through the execution of the Read process program 3240 by the CPU 3010. The reading process is executed when the Read process program 3240 receives the Read request (transmitted at Step S705 in FIG. 8) from the request reception program 3210.

When the Read request is received (S1001), the Read process program 3240 determines whether or not the Read target data (referred to as target data in the description of this process) is present in the data management table 3025 (S1002). From this result, when the target data is present in the data management table 3025 (S1002: Yes), the Read process program 3240 reads the target data from the data management table 3025 (S1003), transmits a response including the read target data to the requester (S1005), and terminates the process.

Meanwhile, when the target data is not present in the data management table 3025 (S1002: No), the Read process program 3240 reads the target data from the data storage area 3140 (S1004), transmits a response including the read target data to the requester (S1005), and terminates the process.

Next, the following describes a setting change process.

Figure 12:
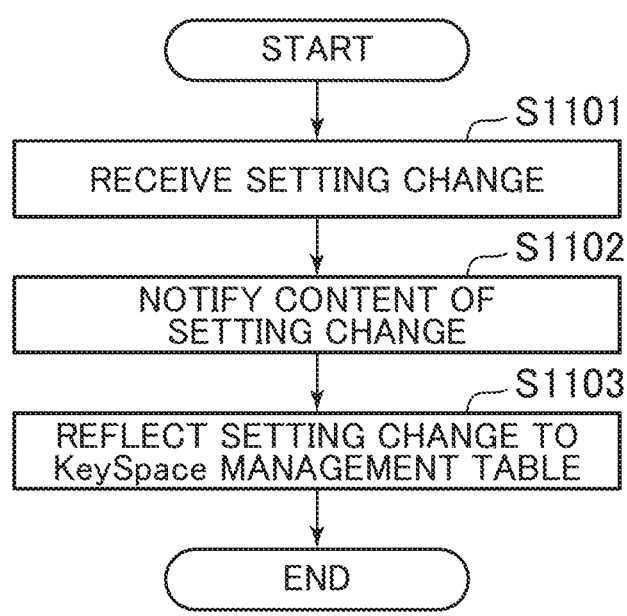
FIG. 12 is a flowchart for a setting change process according to the first embodiment.

FIG. 12 is a flowchart for the setting change process according to the first embodiment.

The setting change process is executed through the execution of the cluster communication program 3250 by the CPU 3010. The setting change process is executed when the cluster communication program 3250 receives the setting change from the client computer 1010.

When the setting change is received from the client computer 1010 (S1101), the cluster communication program 3250 refers to the node information management table 3110, notifies all node computers 1020 constituting the distributed database cluster 1050 of the content (setting change content) of the received setting change (S1102), reflects the setting change to the KeySpace management table 3120 in its own device (S1103), and terminates the process. The cluster communication programs 3250 in the other node computers 1020 that have received the notification indicative of the setting change content from this node computer 1020 reflect the setting change to the KeySpace management tables 3120 in the respective devices.

As described above, the distributed database cluster 1050 according to the embodiment manages the identical data using the node computers 1020 with the SSDs by the count of the match level and the node computers 1020 with the HDDs by the count insufficient for the redundancy level. Accordingly, in the Write process and the Read process, the node computers 1020 with the SSDs can improve the responsiveness and the node computers 1020 by the count of the redundancy level including the node computers 1020 with the HDDs can secure the redundancy of the data. This allows achieving the high-performance and low-cost distributed database cluster 1050.

Second Embodiment

Next, the following describes the computer system according to the second embodiment of the present invention. The computer system according to the second embodiment mainly describes points different from the computer system according to the first embodiment.

Figure 13:
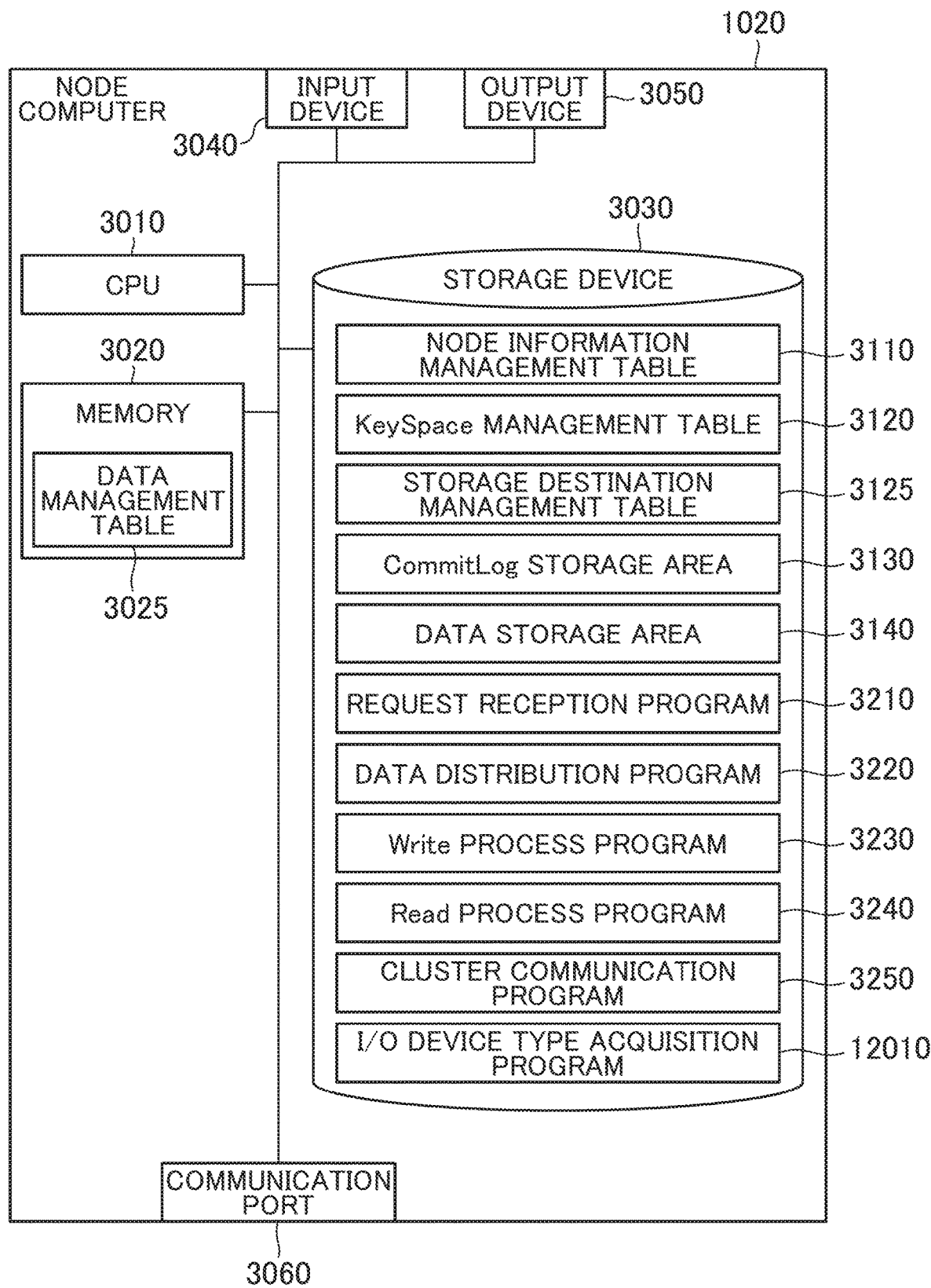
FIG. 13 is a block diagram of a node computer according to a second embodiment.

FIG. 13 is a block diagram of the node computer according to the second embodiment.

The node computer according to the second embodiment additionally includes an I/O device type acquisition program 12010 in the storage device 3030 in the node computer according to the first embodiment illustrated in FIG. 3, and a part of processes by the cluster communication program 3250 is changed. Here, a type acquisition unit is configured through the execution of the I/O device type acquisition program 12010 by the CPU 3010.

Next, the following describes a device type acquisition process by the node computers 1020 according to the second embodiment.

Figure 14:
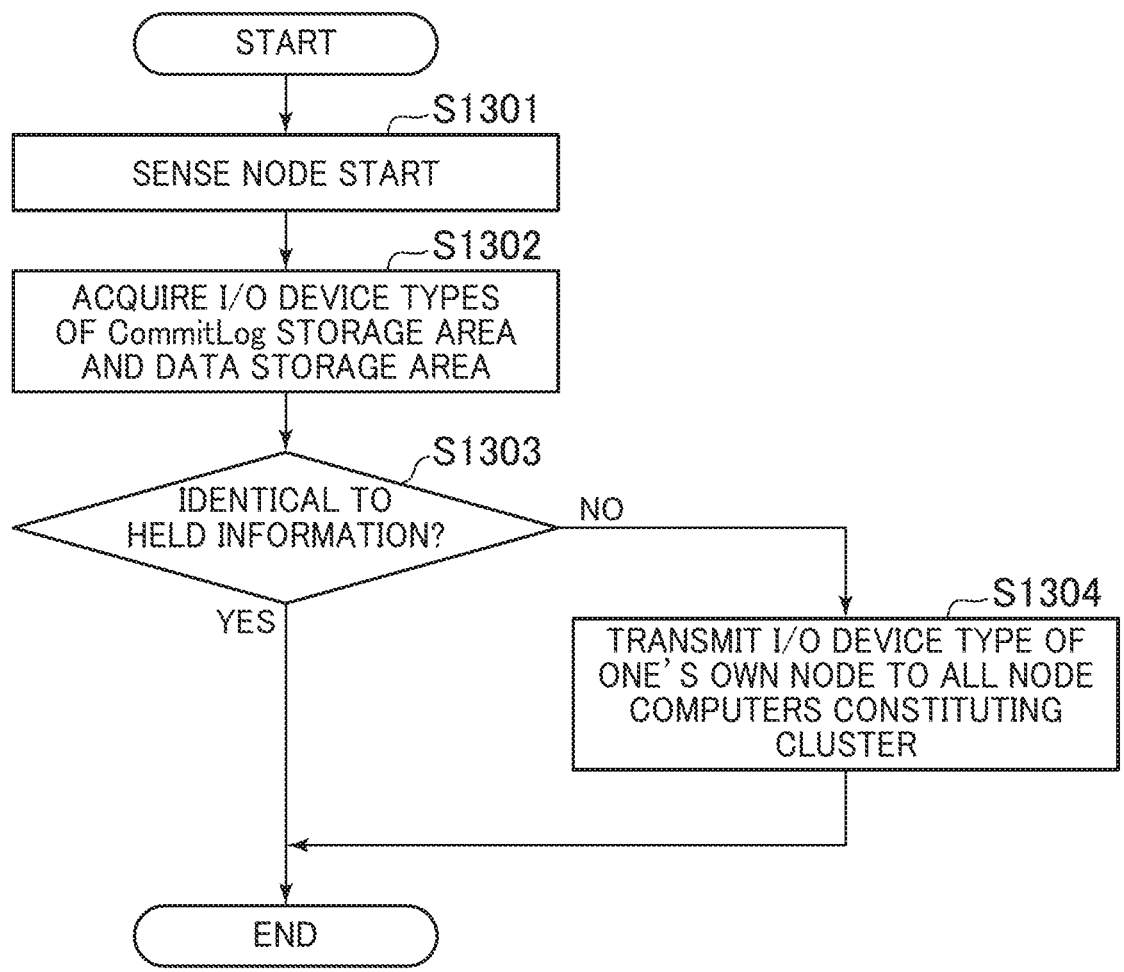
FIG. 14 is a flowchart for a device type acquisition process according to the second embodiment.

FIG. 14 is a flowchart for the device type acquisition process according to the second embodiment.

The device type acquisition process is executed through the execution of the I/O device type acquisition program 12010 by the CPU 3010. The device type acquisition process is executed when the I/O device type acquisition program 12010 detects the start of the node computers 1020.

When the node computer 1020 is started (S1301), the I/O device type acquisition program 12010 acquires the types of the I/O devices constituting the CommitLog storage area 3130 and the data storage area 3140 in one's own node computer 1020 using a function of an Operating System (OS) operating on one's own node computer 1020 (S1302). For example, when the OS is Linux (registered trademark), a result of execution of "lsblk -o name, rota" is acquired. It can be determined that the I/O device is the SSD with the ROTA value of 0 and the I/O device is the HDD with the ROTA value of 1. Alternatively, the CPU 3010 may measure the actual I/O performance of the I/O device using a technique of I/O benchmark and acquire the I/O device type according to the measurement result. A functional unit configured by the CPU 3010 at this time is equivalent to a type identification unit.

Next, the I/O device type acquisition program 12010 confirms the setting of the I/O device type 3110d in the node information management table 3110 of one's own node computer 1020 and determines whether or not the I/O device type acquired at Step S1302 is identical to the held value (S1303). From this result, when the acquired I/O device type is identical to the held value (S1303: Yes), the I/O device type acquisition program 12010 terminates the process.

Meanwhile, when the acquired I/O device type is not identical to the held value (S1303: No), the I/O device type acquisition program 12010 transmits a change notification of the I/O device type of one's own node computer 1020 to all node computers 1020 constituting the distributed database cluster 1050 by the cluster communication program 3250 (S1304) and terminates the process.

Next, the following describes a device type update process.

Figure 15:
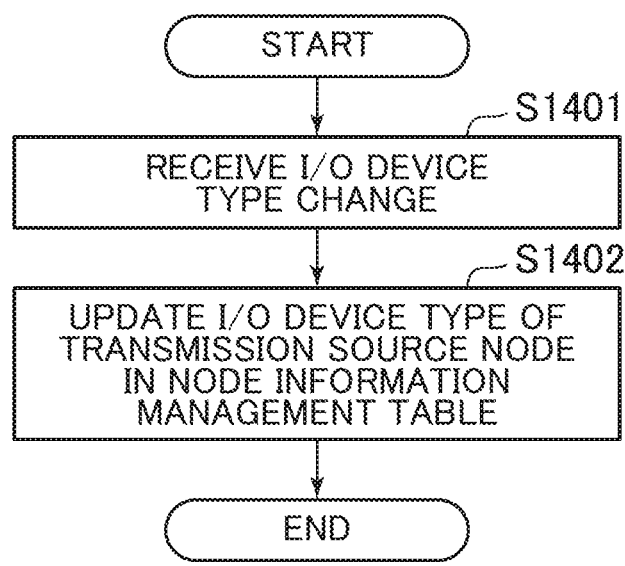
FIG. 15 is a flowchart for a device type update process according to the second embodiment.

FIG. 15 is a flowchart for the device type update process according to the second embodiment.

The device type update process is executed through the execution of the cluster communication program 3250 by the CPU 3010. The device type update process is executed when the change notification of the I/O device type is received from another node computer 1020.

When the change notification of the I/O device type is received from another node computer 1020 (S1401), the cluster communication program 3250 updates the value of the I/O device type 3110d in the entry corresponding to the node computer 1020 as the transmission source in the node information management table 3110 to the I/O device type in the received change type (S1402) and terminates the process. This allows maintaining the I/O device types of the respective node computers 1020 in the node information management tables 3110 in the respective node computers 1020 in the latest state.

The computer system according to the embodiment eliminates the need to confirm the I/O device type of each node computer 1020 and configure the setting to the node information management table 3110 by the user.

Third Embodiment

Next, the following describes a computer system according to the third embodiment of the present invention. The computer system according to the third embodiment mainly describes points different from the computer system according to the second embodiment.

First, the following describes the computer system according to the third embodiment.

Figure 16:
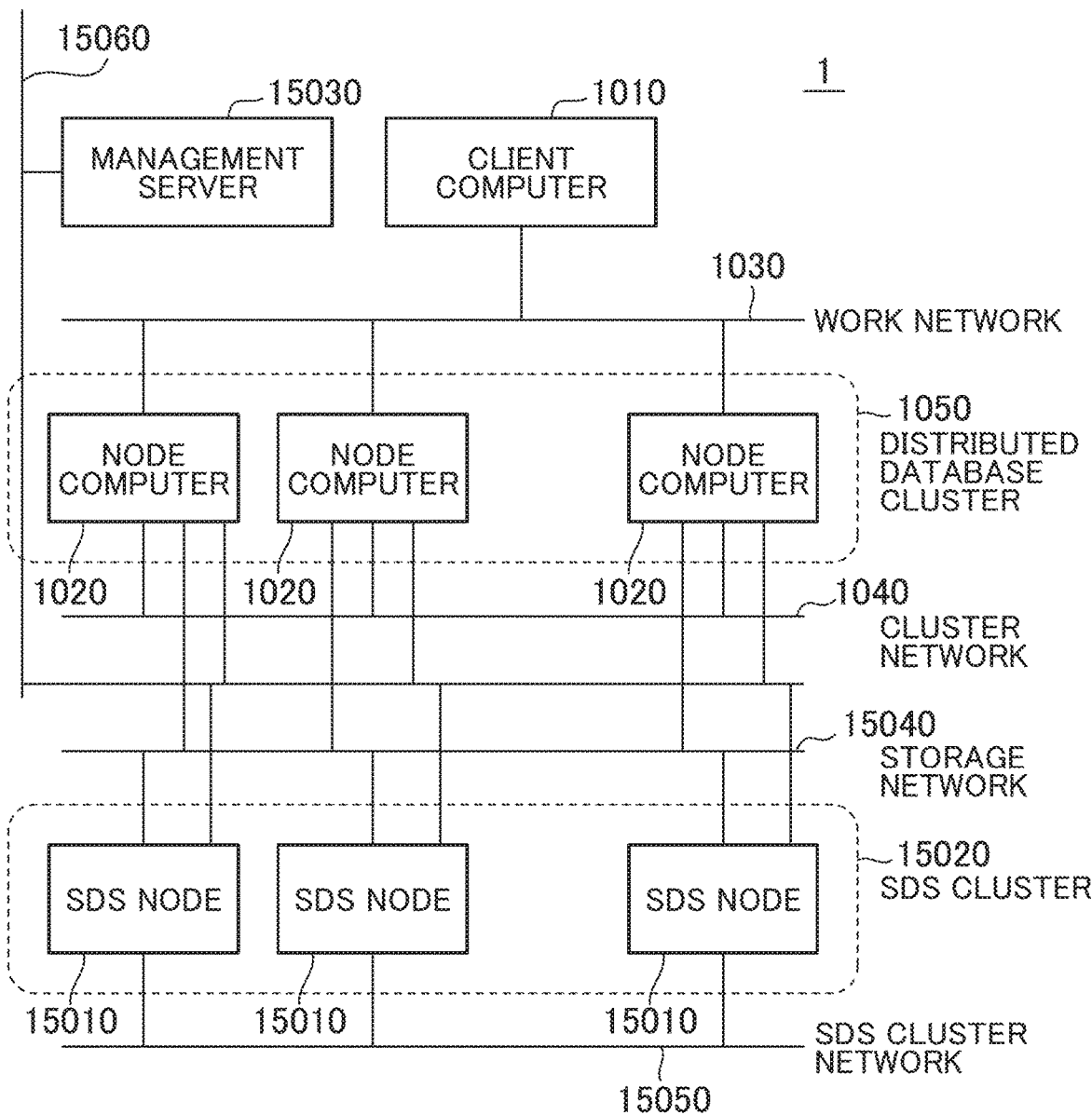
FIG. 16 is an overall block diagram of a computer system according to a third embodiment.

FIG. 16 is an overall block diagram of the computer system according to the third embodiment.

The computer system according to the third embodiment additionally includes a Software Defined Storage (SDS) node 15010 as one example of one or more storage nodes and a management server 15030 in the computer system according to the second embodiment. The node computers 1020 and the SDS nodes 15010 are coupled via a storage network 15040. The respective SDS nodes 15010 are coupled via an SDS cluster network 15050. The plurality of SDS nodes 15010 constitute an SDS cluster 15020. The management server 15030, the node computers 1020, and the SDS nodes 15010 are coupled over a management network 15060.

The work network 1030, the cluster network 1040, the storage network 15040, the SDS cluster network 15050, and the management network 15060 may be respective different networks or a part of or all of the networks may be an identical network. While this embodiment employs the SDS nodes, storage nodes configured of dedicated hardware may be employed instead of the SDS nodes. Note that, in the computer system 1, a combination of the distributed database cluster 1050, the SDS cluster 15020, and the management server 15030 corresponds to the distributed database system.

The node computer 1020 according to the third embodiment is different from the node computer 1020 according to the second embodiment in the function of the I/O device type acquisition program 12010.

Next, the following describes the SDS nodes.

Figure 17:
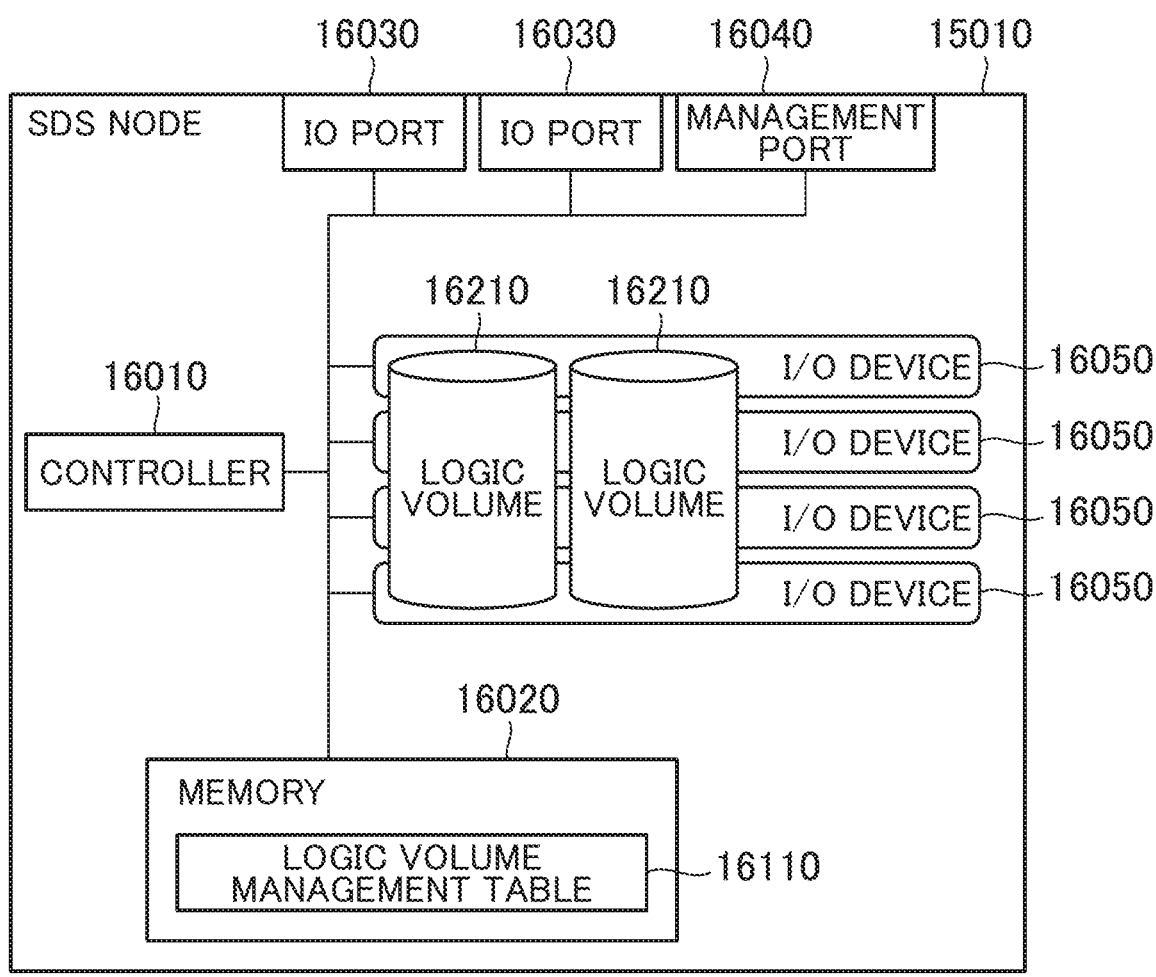
FIG. 17 is a block diagram of an SDS node according to the third embodiment.

FIG. 17 is a block diagram of the SDS node according to the third embodiment.

The SDS nodes 15010 is a storage node constituted using, for example, a general-purpose calculator and includes a controller 16010, a memory 16020, I/O ports 16030, a management port 16040, and one or more I/O devices 16050.

The I/O ports 16030 are interfaces for communications that communicate with the respective node computers 1020 via the storage network 15040 and communicate with the other SDS nodes 15010 via the SDS cluster network 15050.

The management port 16040 is an interface for communications that communicates with the management server 15030 via the management network 15060.

The controller 16010 executes various processes in accordance with programs stored in the memory 16020 and/or the I/O devices 16050.

The memory 16020 is, for example, a RAM that stores the programs executed by the controller 16010 and required information. In this embodiment, the memory 16020 stores a logic volume management table 16110.

The I/O device 16050 is, for example, the HDD and the SSD that stores the programs executed by the controller 16010, data used by the controller 16010, and user data used by the client computer 1010. For example, with the type of the I/O device 16050 of the SSD, the I/O device 16050 features the performance (I/O performance) of the response speed in the I/O higher than that of the HDD. Meanwhile, with the type of the I/O device 16050 of the HDD, the cost of the I/O device 16050 can be lowered compared with that of the SSD.

In this embodiment, storage areas cut off from the I/O devices 16050 are provided to the node computers 1020 as logic volumes 16210. The logic volumes 16210 may be configured of storage areas based on a Redundant Array of Independent (RAID) (or Inexpensive Disks)) group configured of the plurality of I/O devices 16050.

Next, the following describes the logic volume management table 16110.

FIG. 18 is a block diagram of the logic volume management table according to the third embodiment.

The logic volume management table 16110 stores entries for each logic volume managed in the SDS node 15010. The logic volume management table 16110 entries include columns of a logic volume ID 16110a, a connection destination 16110b, an I/O device ID 16110c, and an I/O device type 16110d.

The logic volume ID 16110a stores an identifier (logic volume ID) that uniquely identifies the logic volume corresponding to the entry. The connection destination 16110b stores the node ID of the node computer 1020 using the logic volume corresponding to the entry. The I/O device ID 16110*c* stores an identifier (I/O device ID) of the I/O device constituting the logic volume. The I/O device type 16110*d* stores the I/O device type constituting the logic volume corresponding to the entry. When the SDS node 15010 receives a request of information on the logic volume management table 16110 from the management server 15030, the SDS node 15010 returns the information of the logic volume management table 16110 as the response.

Next, the following describes the management server 15030.

Figure 19:
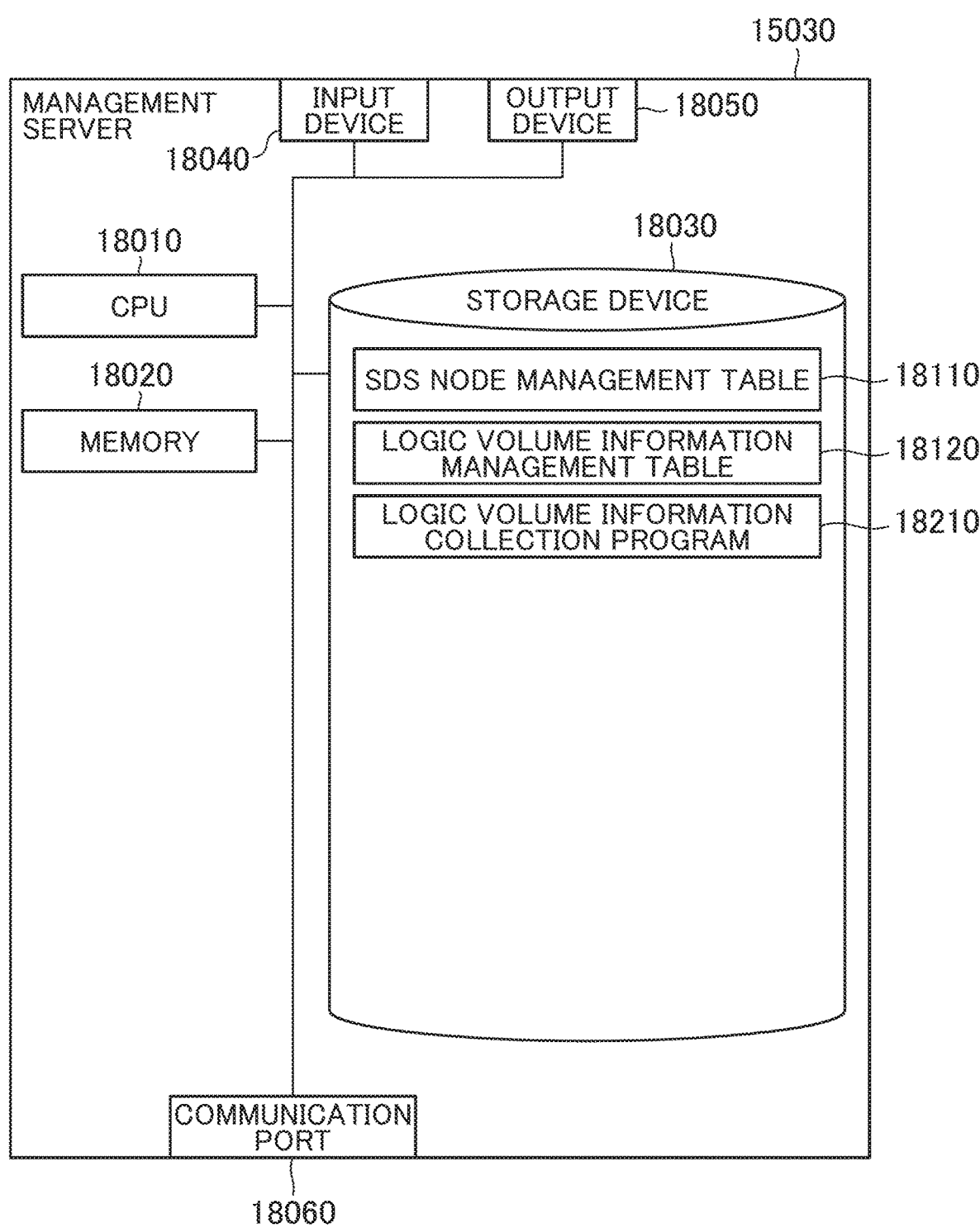
FIG. 19 is a block diagram of a management server according to the third embodiment.

FIG. 19 is a block diagram of the management server according to the third embodiment.

The management server 15030 includes a CPU 18010 as one example of a processor, a memory 18020, a storage device 18030, an input device 18040, an output device 18050, and a communication port 18060.

The communication port 18060 is an interface such as a wired LAN card and a wireless LAN card that communicates with the respective node computers 1020 and SDS nodes 15010 via the management network 15060.

The CPU 18010 executes various processes in accordance with programs stored in the memory 18020 and/or the storage device 18030.

The memory 18020 is, for example, a RAM that stores the programs executed by the CPU 18010 and required information.

The storage device 18030 is, for example, the HDD and the SSD that stores the programs executed by the CPU 18010, the data used by the CPU 18010, and the like. In this embodiment, the storage device 18030 stores an SDS node management table 18110, a logic volume information management table 18120, and a logic volume information collection program 18210. The logic volume information collection program 18210 is loaded on the memory 18020 and executed by the CPU 18010.

The input device 18040 is, for example, a device that accepts an operation input by the user with, for example, a computer mouse and a keyboard. The output device 18050 is a device such as a display that displays and outputs various kinds of information.

Next, the following describes the SDS node management table 18110.

Figure 20:
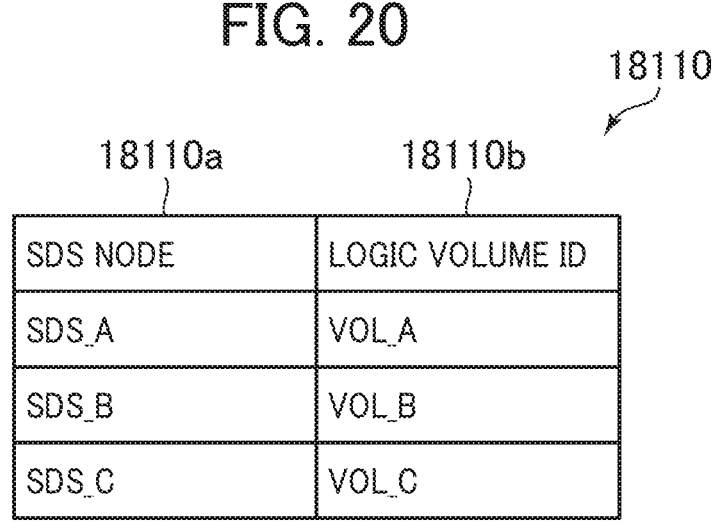
FIG. 20 is a block diagram of an SDS node management table according to the third embodiment.

FIG. 20 is a block diagram of the SDS node management table according to the third embodiment.

The SDS node management table 18110 is a table to manage the logic volumes stored by the SDS nodes 15010 and includes entries including columns of an SDS node 18110*a* and a logic volume ID 18110*b*. The SDS node 18110*a* stores an identifier (SDS node ID) that uniquely identifies the SDS node 15010 constituting the SDS cluster 15020. The logic volume ID 18110*b* stores an identifier (logic volume ID) that uniquely identifies the logic volume managed by the SDS node 15010 corresponding to the entry.

Next, the following describes the logic volume information management table 18120.

Figure 21:
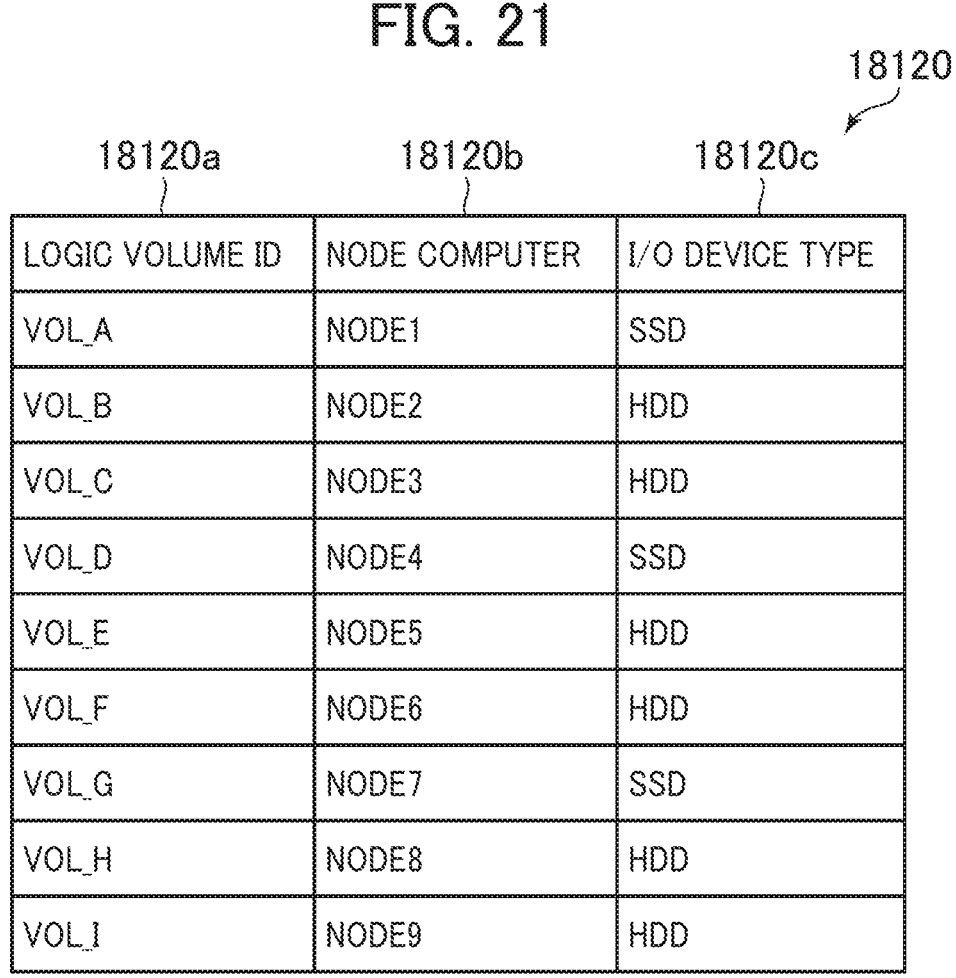
FIG. 21 is a block diagram of a logic volume information management table according to the third embodiment.

FIG. 21 is a block diagram of the logic volume information management table according to the third embodiment.

The logic volume information management table 18120 stores entries for each logic volume. The logic volume information management table 18120 entries include columns of a logic volume ID 18120*a*, a node computer 18120*b*, and an I/O device type 18120*c*. The logic volume ID 18120*a* stores a logic volume ID of the logic volume corresponding to the entry. The node computer 18120*b* stores the node ID of the node computer 1020 coupled to the logic volume corresponding to the entry. The I/O device type 18120*c* stores the I/O device type constituting the logic volume corresponding to the entry.

Next, the following describes a logic volume information update process in the management server 15030.

Figure 22:
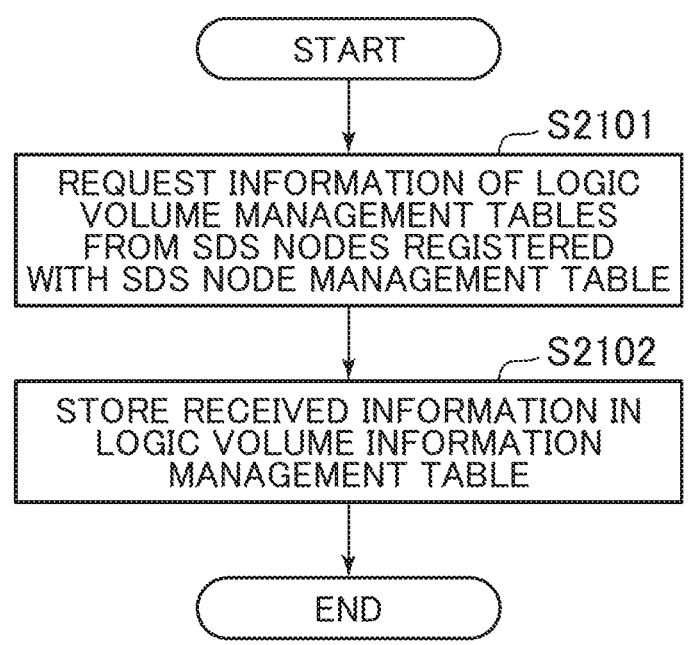
FIG. 22 is a flowchart for a logic volume information update process according to the third embodiment.

FIG. 22 is a flowchart for the logic volume information update process according to the third embodiment.

The logic volume information update process is executed through the execution of the logic volume information collection program 18210 by the CPU 18010.

The logic volume information collection program 18210 refers to the SDS node management table 18110 and requests the information of the logic volume management tables 16110 from all SDS nodes 15010 registered with the SDS node management table 18110 (S2101). In response to this request, the respective SDS nodes 15010 respond with the information of the respective entries in the logic volume management tables 16110.

Next, when the responses are received from the request destination SDS nodes 15010, the logic volume information collection program 18210 stores the received logic volumes ID in the logic volume IDs 18120*a* in the logic volume information management table 18120, stores the node IDs of the node computers 1020 as the connection destinations in the node computers 18120*b*, adds entries in which values of the I/O device types are stored in the I/O device type 18120*c* (S2102), and terminates the process.

Next, the following describes the device type acquisition process of the node computer 1020.

Figure 23:
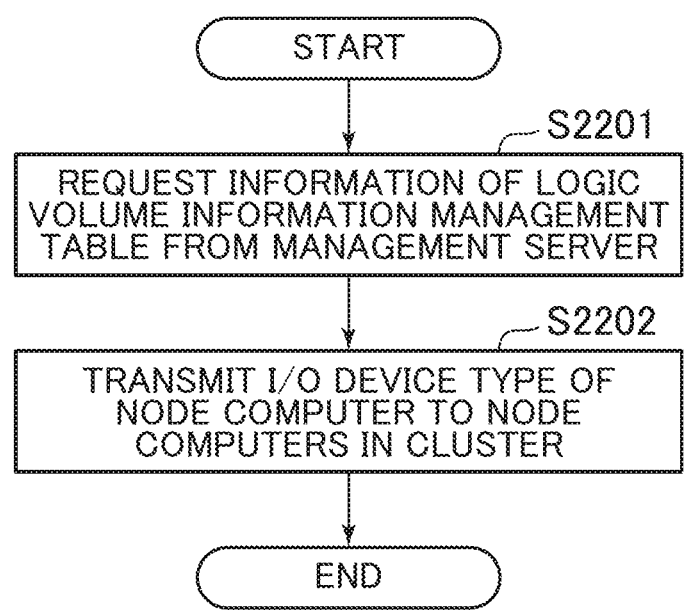
FIG. 23 is a flowchart for a device type acquisition process according to the third embodiment.

FIG. 23 is a flowchart for the device type acquisition process according to the third embodiment.

The device type acquisition process is executed through the execution of the I/O device type acquisition program 12010 in the node computer 1020 by the CPU 3010.

The I/O device type acquisition program 12010 requests the information of the logic volume information management table 18120 from the management server 15030 (S2201). The management server 15030 responds to this request with the information of the respective entries in the logic volume information management table 18120.

When the response is received from the management server 15030, the I/O device type acquisition program 12010 stores the I/O device type during response in the I/O device type 3110*d* in the entry corresponding to the node ID during response in the node information management table 3110. Furthermore, the I/O device type acquisition program 12010 transmits the node ID and the I/O device type during response to the respective node computers 1020 held in the node information management table 3110 (S2202) and terminates the process. Then, the node computers 1020 that have received the node ID and the I/O device type store the received I/O device type in the I/O device types 3110*d* in the entries corresponding to the node IDs in the node information management tables 3110.

As described above, even when the logic volume provided from the SDS node 15010 is used as the storage area provided from the node computer 1020 to the client computer 1010, the computer system 1 according to the embodiment eliminates the need to confirm the I/O device type of each node computer 1020 and configure the setting to the node information management table 3110 by the user.

Fourth Embodiment

Next, the following describes a computer system according to the fourth embodiment of the present invention. The computer system according to the fourth embodiment mainly describes points different from the computer system according to the third embodiment.

Figure 24:
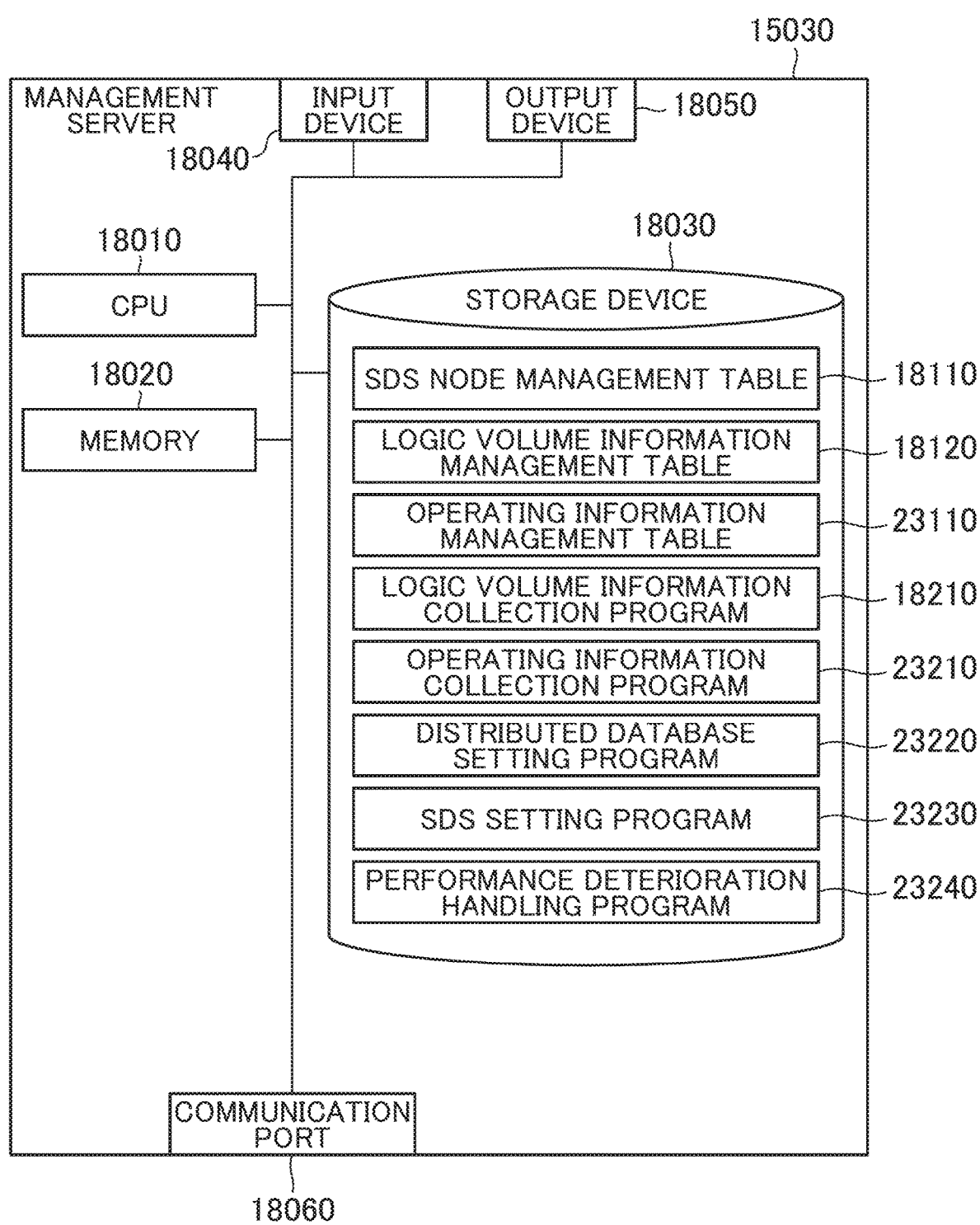
FIG. 24 is a block diagram of a management server according to a fourth embodiment.

FIG. 24 is a block diagram of a management server according to the fourth embodiment.

The management server according to the fourth embodiment further stores an operating information management table 23110, an operating information collection program 23210, a distributed database setting program 23220, an SDS setting program 23230, and a performance deterioration handling program 23240 in the storage device 18030 in the management server according to the third embodiment. Here, the execution of the performance deterioration handling program 23240 by the CPU 18010 constitutes a node state determining unit. The execution of the SDS setting program 23230 by the CPU 18010 constitutes a volume setting unit. The execution of the distributed database setting program 23220 by the CPU 18010 constitutes a response count adjusting unit.

The operating information collection program 23210 executes polling on the SDS nodes 15010 constituting the SDS cluster 15020, acquires Input/Output Per Seconds (IOPSs), CPU usage percentages, and the I/O device types, and stores the data in the operating information management table 23110.

The distributed database setting program 23220 designates KeySpace to the node computers 1020 and notifies the change in the match level. When the node computer 1020 receives the notification of the change in the match level, the node computer 1020 changes the setting of the match level 3120c in the entry of the change target KeySpace in the KeySpace management table 3120. The cluster communication program 3250 in the node computer 1020 notifies all other node computers 1020 in the distributed database cluster 1050 of the change in the match level. Thus, in all other node computers 1020, the settings of the match levels 3120c in the entries of the change target KeySpaces in the KeySpace management tables 3120 are changed.

The SDS setting program 23230 notifies the SDS node 15010 of a volume addition setting. When the SDS node 15010 receives the notification of the volume addition setting, the SDS node 15010 additionally creates the logic volume 16210, creates a logic volume in combination of the existing logic volume used by the node computer 1020 and a new logic volume for use by the node computer 1020.

Next, the following describes the operating information management table 23110.

FIG. 25 is s block diagram of the operating information management table according to the fourth embodiment.

The operating information management table 23110 stores entries for each SDS node 15010. The operating information management table 23110 entries include columns for a node 23110a, an TOPS 23110b, a CPU usage percentage 23110c, and an I/O device type 23110d.

The node 23110a stores the node ID of the SDS node 15010 corresponding to the entry. The IOPS 23110b stores IOPS of the SDS node 15010 corresponding to the entry. The CPU usage percentage 23110c stores the usage percentage of the CPU of the controller 16010 in the SDS node 15010 corresponding to the entry. The I/O device type 23110d stores the I/O device type used in the SDS node 15010 corresponding to the entry.

Next, the following describes a performance deterioration handling process of the management server 15030.

Figure 26:
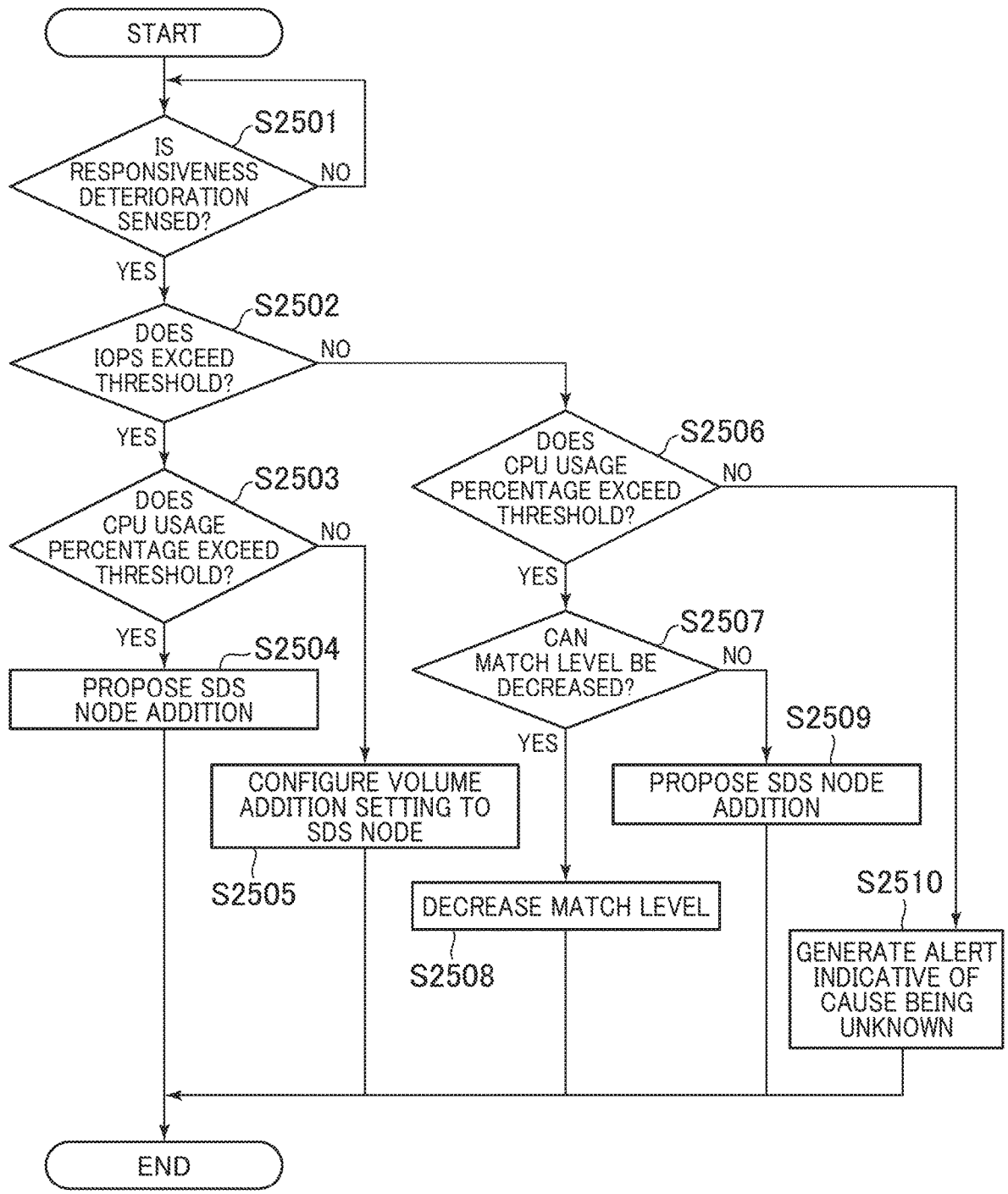
FIG. 26 is a flowchart for a performance deterioration handling process according to the fourth embodiment.

FIG. 26 is a flowchart for the performance deterioration handling process according to the fourth embodiment.

The performance deterioration handling process is executed through the execution of the performance deterioration handling program 23240 by the CPU 18010.

The performance deterioration handling program 23240 (to be exact, the CPU 18010 executing the performance deterioration handling program 23240) executes polling on the respective node computers 1020, acquires the response times in the I/Os to the client computer 1010 in the distributed database cluster 1050, and senses whether or not the response times exceed a predetermined threshold or not, that is, the responsiveness is deteriorated (S2501).

When the responsiveness deterioration is sensed (S2501: Yes), the performance deterioration handling program 23240 refers to the operating information management table 23110 and determines whether or not the IOPS of the IOPS 23110b in the entry corresponding to the SDS node 15010 exceeds the predetermined threshold for IOPS (S2502).

From this result, when the IOPS exceeds the threshold (S2502: Yes), the performance deterioration handling program 23240 confirms whether or not the CPU usage percentage of the CPU usage percentage 23110c in the corresponding entry exceeds a predetermined threshold for CPU usage percentage (S2503).

From this result, when the CPU usage percentage exceeds the threshold (S2503: Yes), the performance deterioration handling program 23240 proposes the addition of the SDS node 15010 (S2504) and terminates the process. For example, the performance deterioration handling program 23240 displays a screen containing the proposal for the addition of the SDS node 15010 on the output device 18050. Meanwhile, when the CPU usage percentage does not exceed the threshold (S2503: No), the performance deterioration handling program 23240 notifies the SDS node 15010 of an addition setting of a volume with the SDS setting program 23230 (S2505) and terminates the process.

Meanwhile, when the IOPS does not exceed the threshold (S2502: No), the performance deterioration handling program 23240 confirms whether or not the CPU usage percentage of the CPU usage percentage 23110c in the corresponding entry exceeds the predetermined threshold for CPU usage percentage (S2506).

From this result, when the CPU usage percentage exceeds the threshold (S2506: Yes), the performance deterioration handling program 23240 determines whether the match level can be decreased or not (S2507). Whether the match level can be decreased or not can be determined by whether the match level is two or more.

From this result, when the match level can be decreased (S2507: Yes), the performance deterioration handling program 23240 notifies the node computer 1020 of an instruction to decrease the match level by the distributed database setting program 23220 (S2508) and terminates the process. Meanwhile, when the match level cannot be decreased (S2507: No), the performance deterioration handling program 23240 proposes the addition of the SDS node 15010 (S2509) and terminates the process.

Meanwhile, when the CPU usage percentage does not exceed the threshold (S2506: No), the performance deterioration handling program 23240 generates an alert indicative of the cause of the responsiveness deterioration is unknown (S2510) and terminates the process.

As described above, the computer system according to the embodiment can execute the appropriate handling when the responsiveness of the distributed database cluster 1050 is deteriorated.

Fifth Embodiment

Next, the following describes a computer system according to the fifth embodiment of the present invention. The computer system according to the fifth embodiment mainly describes points different from the computer system according to the fourth embodiment.

Figure 27:
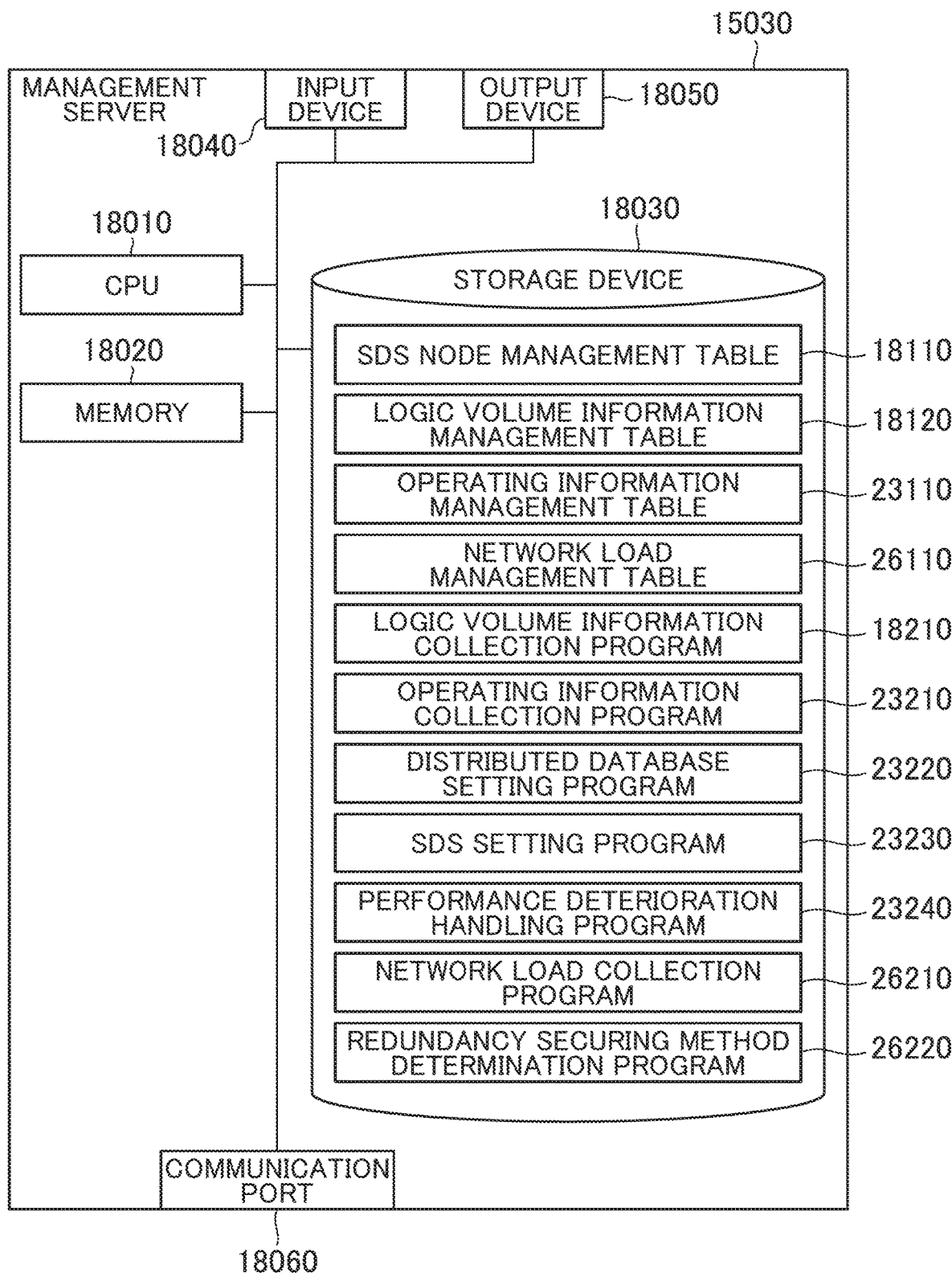
FIG. 27 is a block diagram of a management server according to a fifth embodiment.

FIG. 27 is a block diagram of a management server according to the fifth embodiment.

The management server according to the fifth embodiment further stores a network load management table 26110, a network load collection program 26210, and a redundancy securing method determination program 26220 in the storage device 18030 in the management server according to the fourth embodiment. Here, the execution of the redundancy securing method determination program 26220 by the CPU 18010 constitutes a band determining unit and a redundancy setting unit.

The network load collection program 26210 queries a network switch (not illustrated) constituting the network (the cluster network 1040 and the SDS cluster network 15050) about a band usage percentage and stores the band usage percentage acquired as the response in a band usage percentage 26110b in the network load management table 26110 described later.

Next, the following describes the network load management table 26110.

FIG. 28 is a block diagram of the network load management table according to the fifth embodiment.

The network load management table 26110 stores entries for each network (the cluster network 1040 and the SDS cluster network 15050). The network load management table 26110 entries include columns of a network 26110a and the band usage percentage 26110b. The network 26110a stores a network name indicative of the network. The band usage percentage 26110b stores the band usage percentage in the network corresponding to the entry.

Next, the following describes a redundancy securing method determination process of the management server 15030.

Figure 29:
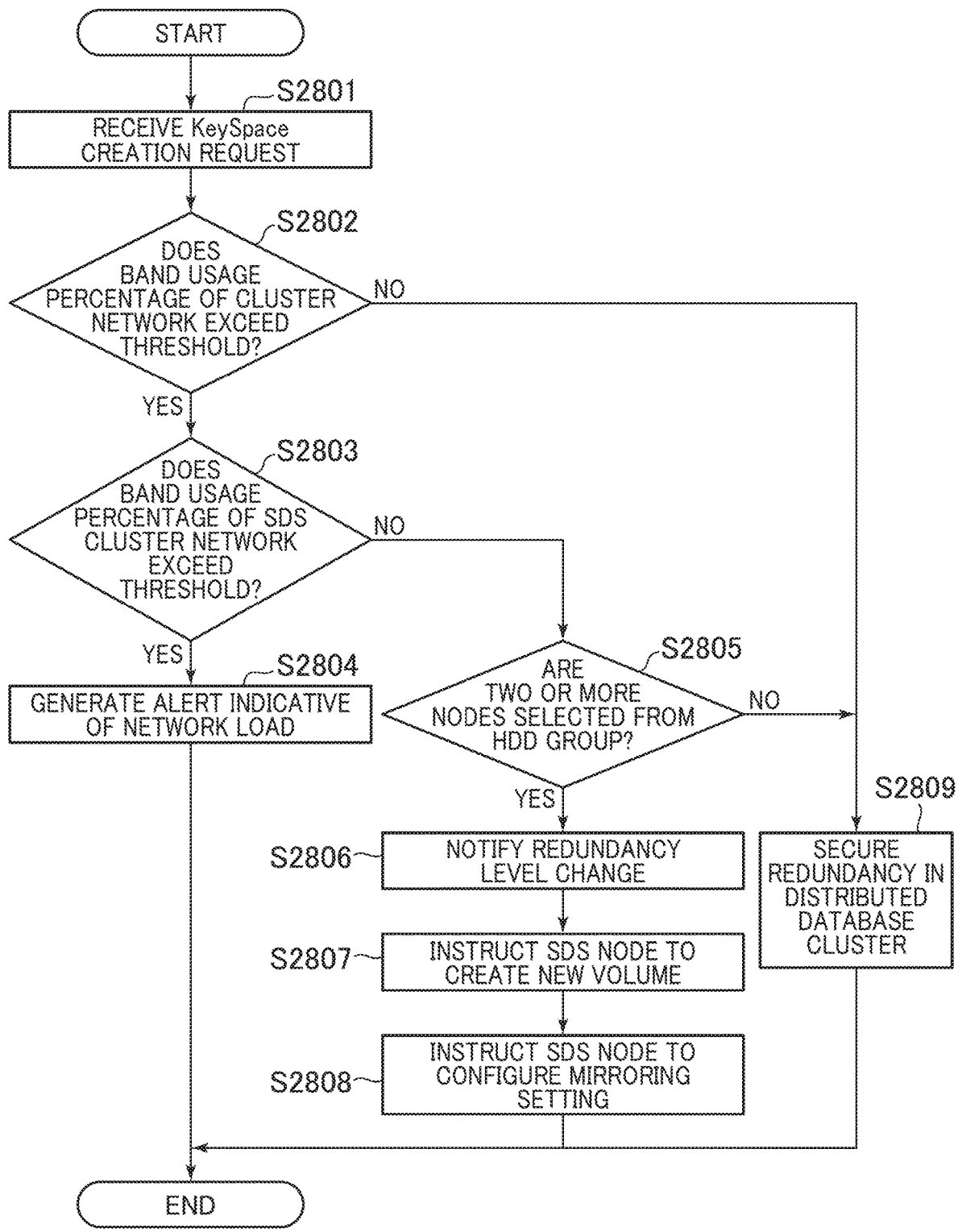
FIG. 29 is a flowchart for a redundancy securing method determination process according to the fifth embodiment.

FIG. 29 is a flowchart for the redundancy securing method determination process according to the fifth embodiment.

The redundancy securing method determination process is executed through the execution of the redundancy securing method determination program 26220 by the CPU 18010. The redundancy securing method determination process is executed, for example, when the redundancy securing method determination program 26220 receives a KeySpace creation request from the client computer 1010. The KeySpace creation request includes, for example, designations the ID of KeySpace to be created, the redundancy level, and the match level.

When the KeySpace creation request is received (S2801), the redundancy securing method determination program 26220 refers to the network load management table 26110 and determines whether or not the band usage percentage of the cluster network 1040 exceeds a predetermined threshold (S2802).

From this result, when the band usage percentage exceeds the threshold (S2802: Yes), the redundancy securing method determination program 26220 determines whether or not the band usage percentage of the SDS cluster network 15050 exceeds the predetermined threshold (S2803).

From this result, when the band usage percentage of the SDS cluster network 15050 exceeds the threshold (S2803: Yes), the redundancy securing method determination program 26220 generates an alert indicative of a network load (S2804) and terminates the process.

Meanwhile, when the band usage percentage of the SDS cluster network 15050 does not exceed the threshold (S2803: No), the redundancy securing method determination program 26220 confirms the redundancy level and the match level of the KeySpace creation request and confirms whether or not to select the two or more node computers 1020 creating the replicas from the group (HDD group) of the node computers 1020 using the HDDs (S2805). Specifically, the confirmation can be executed by whether a difference between the redundancy level and the match level is two or more.

From this result, to select the two or more node computers 1020 using the HDDs, the redundancy securing method determination program 26220 notifies the node computers 1020 of the setting change to set a value of decreasing the designated redundancy level by one as the redundancy level (S2806). Thus, in the distributed database cluster 1050, the replicas for new Keyspace are stored in the node computers 1020 by the count smaller than the designated redundancy level by one, thus ensuring reducing the used band in the cluster network 1040.

Next, the redundancy securing method determination program 26220 instructs the SDS node 15010 to create a new volume (S2807), instructs a setting to mirror a volume to store the one replica to the new volume to the SDS node 15010 (S2808) and terminates the process. The volume storing the replica is thus mirrored between the volumes in the SDS nodes 15010. This allows creating the replication of the replica using the SDS cluster network 15050, without an increase in the used band of the cluster network 1040. Accordingly, the entire computer system can be in a state of holding the replicas by the count identical to the designated redundancy level.

Meanwhile, when the band usage percentage of the cluster network 1040 does not exceed the threshold (S2802: No) or the two or more node computers 1020 using the HDDs are not selected (S2805: No), the redundancy securing method determination program 26220 notifies the node computers 1020 of the setting change by the designated redundancy level (S2809) and terminates the process. Accordingly, in the distributed database cluster 1050, the replicas for new KeySpace are stored in the node computers 1020 by the designated redundancy level.

As described above, according to this embodiment, the distributed database cluster 1050 can secure the redundancy of the replicas using the function (mirroring) of the SDS nodes and can reduce the count of node computers 1020 used to secure the redundancy.

Note that the present invention is not limited to the above-described embodiments and can be appropriately modified and embodied within a scope of not departing from the gist of the present invention.

While in the above-described embodiments, there is provided the different types of storage devices and the storage devices used by the node computers to meet the match level are configured as the storage devices having the high input/output performance, the present invention is not limited to this. For example, the types of the storage devices used by the node computers may be configured to be identical or similar types, the replicas to meet the match level may be non-compressively stored in the storage devices used by the node computers, and the replicas not meeting the redundancy level may be compressively stored in the storage devices used by the node computers. This configuration allows enhancing the responsiveness by the input and output to the non-compressed replicas, and the storage of the some compressed replicas allows reducing a bit cost. In view of this, the distributed database cluster 1050 can achieve the high performance and the low cost.

While the above-described respective embodiments have described the example of the first type storage device as the SSD and the second type storage device as the HDD, the present invention is not limited to this. For example, the first type storage device may be set as a high-performance SSD among the SSDs and the second type storage device may be set as a low-performance SSD among the SSDs. In short, the storage devices only need to be the storage devices whose types can be classified according to the input/output performances.

What is claimed is:

1. A distributed database system that includes a plurality of node computers, the plurality of node computers being capable of storing management target data used by a client computer in storage devices, the storage devices including a first type storage device and a second type storage device, the first type storage device having a high input/output performance, the second type storage device having a low input/output performance, the distributed database system comprising:
management information storage units that store management information including response count information, the response count information indicating a count of the node computers from which the identical management target data are to be read, the identical management target data being required to respond to a read request of the management target data from the client computer;
a storage destination determining unit that determines the node computers by a count indicated by the response count information and capable of storing the management target data in the first type storage devices as storage destinations of the management target data among the plurality of node computers when the storage destination determining unit receives a write request of new management target data from the client computer; and
a storage control unit that causes the determined node computers to store the management target data;
wherein the management information further includes redundancy count information, the redundancy count information indicating a count of the node computers required to store the management target data to secure availability of the management target data; and
the storage destination determining unit adds the node computers by a count of a difference between the count indicated by the redundancy count information and the count indicated by the response count information and capable of storing the management target data in the second type storage devices as the storage destinations of the management target data.

2. The distributed database system according to claim 1, further comprising a type acquisition unit that acquires type information, the type information indicating whether the storage devices are the first type storage device or the second type storage device,
wherein the storage destination determining unit identifies whether or not the node computers are capable of storing the management target data in the first type storage devices based on the acquired type information.

3. The distributed database system according to claim 2, further comprising:
one or more storage nodes that include the storage device, the one or more storage nodes providing a storage area in the storage device to the node computers as a logic volume storing the management target data; and
a management server that manages logic volume information, the logic volume information indicating the node computers to which the logic volume in the storage device in the storage node is provided and a type of the storage device,
wherein the type acquisition unit acquires the type of the storage device that provides the logic volume provided to the node computers from the management server.

4. The distributed database system according to claim 3, further comprising:
a node state determining unit that determines whether or not input/output processes in the storage node exceeds a predetermined threshold, the node state determining unit determining whether or not a usage percentage of a processor in the storage node exceeds a predetermined threshold; and
a volume setting unit that configures a setting to add the logic volume to the storage node when the input/output processes in the storage node exceed the predetermined threshold and the usage percentage of the processor in the storage node does not exceed the predetermined threshold.

5. The distributed database system according to claim 3, further comprising:
a node state determining unit that determines whether or not input/output processes in the storage node exceeds a predetermined threshold, the node state determining unit determining whether or not a usage percentage of a processor in the storage node exceeds a predetermined threshold; and
a response count adjusting unit that lowers response count information when the input/output processes in the storage node do not exceed the predetermined threshold and the usage percentage of the processor in the storage node exceeds the predetermined threshold.

6. The distributed database system according to claim 3, further comprising:
a band determining unit that determines whether or not a band usage percentage in a cluster network coupling the node computers together exceeds a predetermined threshold, the band determining unit determining whether or not a band usage percentage in a storage node cluster network that couples the storage nodes together exceeds a predetermined threshold; and
a redundancy setting unit that decreases redundancy count information in the management target data and configures a setting of mirroring the management target data between the storage nodes when the band usage percentage in the cluster network exceeds the threshold and the band usage percentage in the storage node cluster network does not exceed the threshold.

7. The distributed database system according to claim 6, wherein when a count of a difference between a count indicated by the redundancy count information and a count indicated by the response count information is two or more, the redundancy setting unit decreases the redundancy count information and configures the setting of mirroring the management target data between the storage nodes.

8. The distributed database system according to claim 1, further comprising a type identification unit that identifies whether the storage devices are the first type storage device or the second type storage device from results of an input and an output of actual data for the storage devices.

9. A distributed database management method by a distributed database system that includes a plurality of node computers, the plurality of node computers being capable of storing management target data used by a client computer in storage devices, the storage devices including a first type storage device and a second type storage device, the first type storage device having a high input/output performance, the second type storage device having a low input/output performance, the distributed database method comprising:

storing management information including response count information, the response count information indicating a count of the node computers from which the identical management target data are to be read, the identical management target data being required to respond to a read request of the management target data from the client computer;

determining the node computers by a count indicated by the response count information and capable of storing the management target data in the first type storage devices as storage destinations of the management target data among the plurality of node computers when a write request of new management target data is received from the client computer; and causing the determined node computers to store the management target data;

wherein the management information further includes redundancy count information, the redundancy count information indicating a count of the node computers required to store the management target data to secure availability of the management target data; and adding the node computers by a count of a difference between the count indicated by the redundancy count information and the count indicated by the response count information and capable of storing the management target data in the second type storage devices as the storage destinations of the management target data.

10. A distributed database management program that causes a plurality of node computers in a distributed database system to execute, the distributed database system including the plurality of node computers capable of storing the management target data used by a client computer in storage devices, the storage devices including a first type storage device and a second type storage device, the first type storage device having a high input/output performance, the second type storage device having a low input/output performance, wherein the node computers store management information including response count information, the response count information indicating a count of the node computers from which the identical management target data are to be read, the identical management target data being required to respond to a read request of the management target data from the client computer, and the node computers are caused to function as:

a storage destination determining unit that determines the node computers by a count indicated by the response count information and capable of storing the management target data in the first type storage devices as storage destinations of the management target data among the plurality of node computers when the storage destination determining unit receives a write request of new management target data from the client computer; and a storage control unit that causes the determined node computers to store the management target data;

wherein the management information further includes redundancy count information, the redundancy count information indicating a count of the node computers required to store the management target data to secure availability of the management target data; and the storage destination determining unit adds the node computers by a count of a difference between the count indicated by the redundancy count information and the count indicated by the response count information and capable of storing the management target data in the second type storage devices as the storage destinations of the management target data.

* * * * *